US008243136B2

(12) United States Patent
Aota et al.

(10) Patent No.: US 8,243,136 B2
(45) Date of Patent: Aug. 14, 2012

(54) TAG SENSOR SYSTEM AND SENSOR DEVICE, AND OBJECT POSITION ESTIMATING DEVICE AND OBJECT POSITION ESTIMATING METHOD

(75) Inventors: Kazuyuki Aota, Kanagawa (JP); Yasunari Kimura, Osaka (JP); Mikio Morioka, Kanagawa (JP); Masataka Sugiura, Tokyo (JP); Junko Ueda, Tokyo (JP); Arata Mukai, Tokyo (JP)

(73) Assignee: Panasonic Corporation, Osaka (JP)

( * ) Notice: Subject to any disclaimer, the term of this patent is extended or adjusted under 35 U.S.C. 154(b) by 416 days.

(21) Appl. No.: 12/673,087

(22) PCT Filed: Feb. 27, 2009

(86) PCT No.: PCT/JP2009/000915
§ 371 (c)(1),
(2), (4) Date: Feb. 11, 2010

(87) PCT Pub. No.: WO2009/113265
PCT Pub. Date: Sep. 17, 2009

(65) Prior Publication Data
US 2011/0205358 A1 Aug. 25, 2011

(30) Foreign Application Priority Data

Mar. 11, 2008 (JP) .................................. 2008-061582
Nov. 28, 2008 (JP) .................................. 2008-305149

(51) Int. Cl.
*H04N 7/18* (2006.01)
(52) U.S. Cl. ...................................................... 348/143
(58) Field of Classification Search .................. 348/148, 348/143
See application file for complete search history.

(56) References Cited

FOREIGN PATENT DOCUMENTS

| JP | 2001-359147 A | 12/2001 |
|---|---|---|
| JP | 2004-030022 A | 1/2004 |
| JP | 2005-056213 A | 3/2005 |
| JP | 2005-141687 A | 6/2005 |
| JP | 2006-127240 A | 5/2006 |
| JP | 2006-164199 A | 6/2006 |
| JP | 2006-311111 A | 11/2006 |
| JP | 2007-188279 A | 7/2007 |
| JP | 2007-207260 A | 8/2007 |
| JP | 2007-309757 A | 11/2007 |
| JP | 2007-328747 A | 12/2007 |
| JP | 2008-070206 A | 3/2008 |
| WO | 2007/138811 A1 | 12/2007 |

OTHER PUBLICATIONS

International Search Report for PCT/JP2009/000915.

*Primary Examiner* — Joseph Avellino
*Assistant Examiner* — Marshall McLeod
(74) *Attorney, Agent, or Firm* — Pearne & Gordon LLP

(57) ABSTRACT

A position identifying system (1) is comprised of a radio terminal device (2) carried by a monitoring target and a sensor device (3) provided with a radio communication unit (9) for communicating by radio with the radio terminal device (2) and a camera unit (10) for taking an image of the monitoring target. In the sensor device (3), the position (tag position) of the radio terminal device (2) is detected on the basis of a detection signal from the radio terminal device (2), and the position (image position) of the monitoring target is calculated on the basis of the image taken by the camera unit (3). By linking the tag position with the image position, the position of the monitoring target is identified. Thus, there is provided the position identifying system capable of identifying the position of the monitoring target and keeping track of the movement of the monitoring target even if the image of the monitoring target cannot be taken.

24 Claims, 30 Drawing Sheets

FIG.4
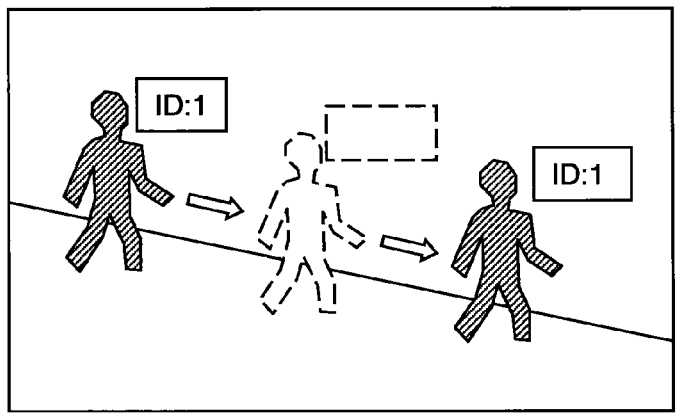
 First discrimination information interpolation processing
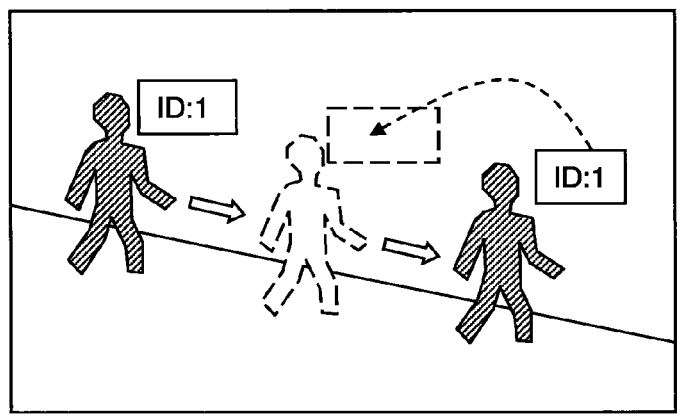

FIG.5
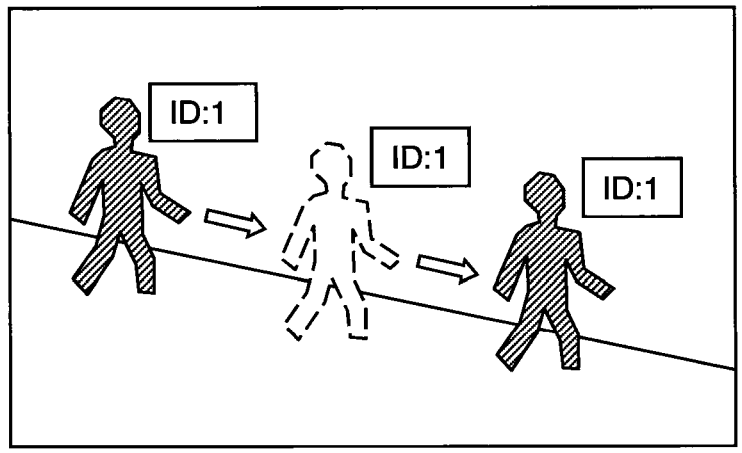
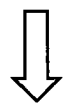 Image interpolation processing
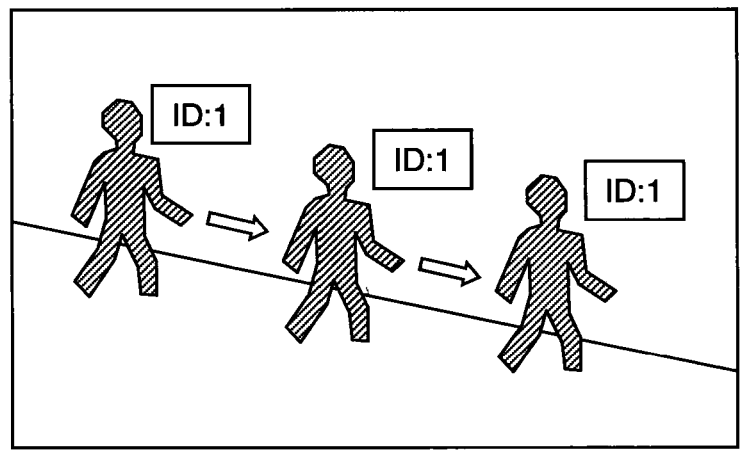

FIG.9
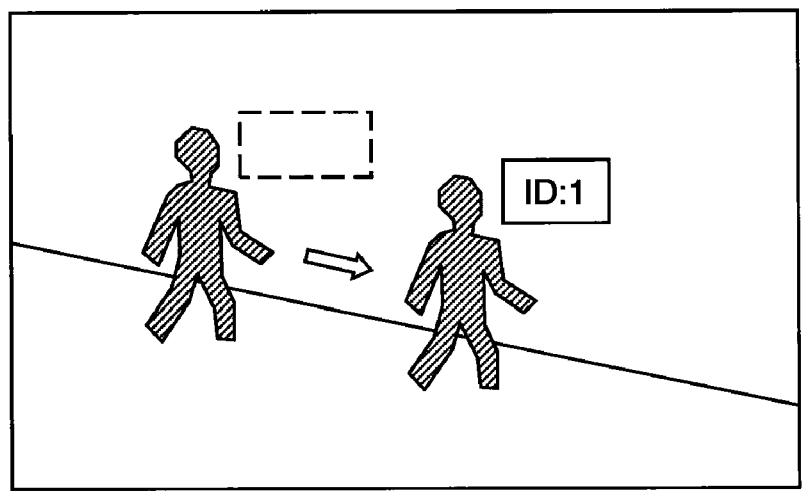
Second discrimination information interpolation processing
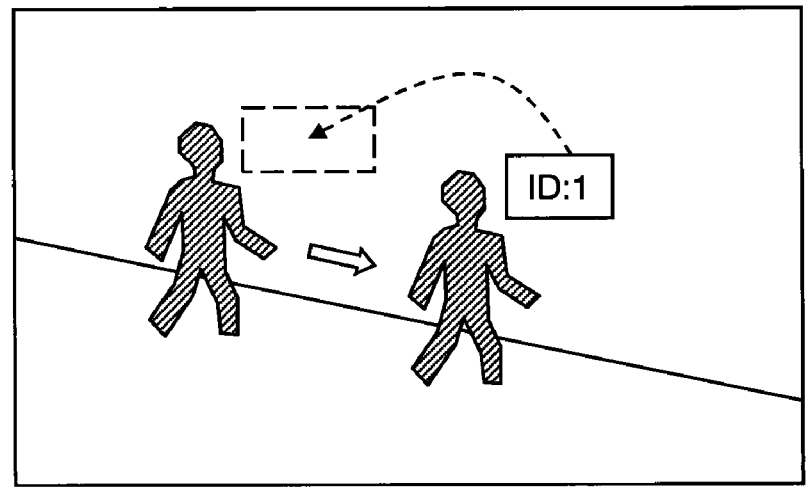

| Time | Image position | Tag position corresponding to image position |
|---|---|---|
| t1 | G1 | (T1,T2) |
|  | G2 | (T2,T3) |
|  | G3 | (T1,T3) |

FIG.12
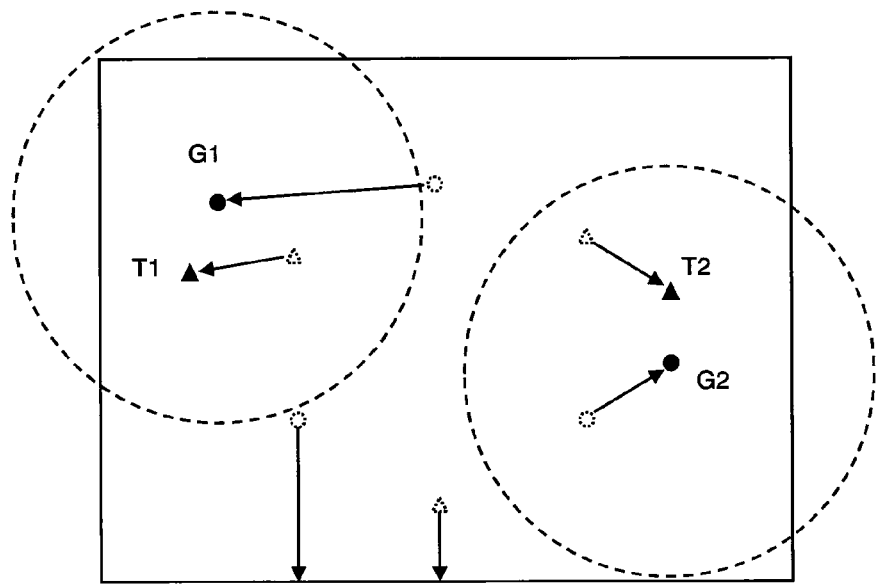
Before correction
| Time | Image position | Tag position corresponding to image position |
|---|---|---|
| t1 | G1 | (T1,T2) |
|  | G2 | (T2,T3) |
|  | G3 | (T1,T3) |
| t2 | G1 | T1 |
|  | G2 | T2 |
After correction
| Time | Image position | Tag position corresponding to image position |
|---|---|---|
| t1 | G1 | T1 |
|  | G2 | T2 |
|  | G3 | T3 |
| t2 | G1 | T1 |
|  | G2 | T2 |

⇩ r11 : r12 = 1 : 3
r21 : r22 = 1 : 1

⇩

| Image position | Candidate information with likelihood |
|---|---|
| G1 | T1(75%), T2(25%) |
| G2 | T1(50%), T2(50%) |

FIG.14

| Time | Image position | Candidate information with likelihood | Data No. |
|---|---|---|---|
| t1 | G1 | T1(70%), T2(30%) | $X_1$ |
|    | G2 | T1(40%), T2(60%) | $X_2$ |
| t2 | G1 | T1(80%), T2(20%) | $X_3$ |
|    | G2 | T1(30%), T2(70%) | $X_4$ |

$$P(T_1|X_1) = \frac{P(X_1|T_1)P(T_1)}{P(X_1)} = \frac{P(X_1|T_1)P(T_1)}{P(X_1|T_1)P(T_1) + P(X_1|T_2)P(T_2)}$$

$$= \frac{0.7 \times 0.5}{0.7 \times 0.5 + 0.3 \times 0.5} = 0.7$$

$$P(T_1|X_2) = \frac{P(X_2|T_1)P(T_1)}{P(X_2)} = \frac{0.6 \times 0.7}{0.6 \times 0.7 + 0.4 \times (1 - 0.7)} = 0.78$$

$$P(T_1|X_3) = \frac{P(X_3|T_1)P(T_1)}{P(X_3)} = \frac{0.8 \times 7/9}{0.8 \times 7/9 + 0.2 \times (1 - 7/9)} = 0.93$$

$$P(T_1|X_4) = \frac{P(X_4|T_1)P(T_1)}{P(X_4)} = \frac{0.7 \times 14/15}{0.7 \times 14/15 + 0.3 \times (1 - 14/15)} = 0.97$$

| Image position | Cell | Tag position corresponding to image position |
|---|---|---|
| G1 | B3 | T1 |
| G2 | C2 | T2 |
| G3 | C1 | (T2,T3) → T3 |

FIG.20
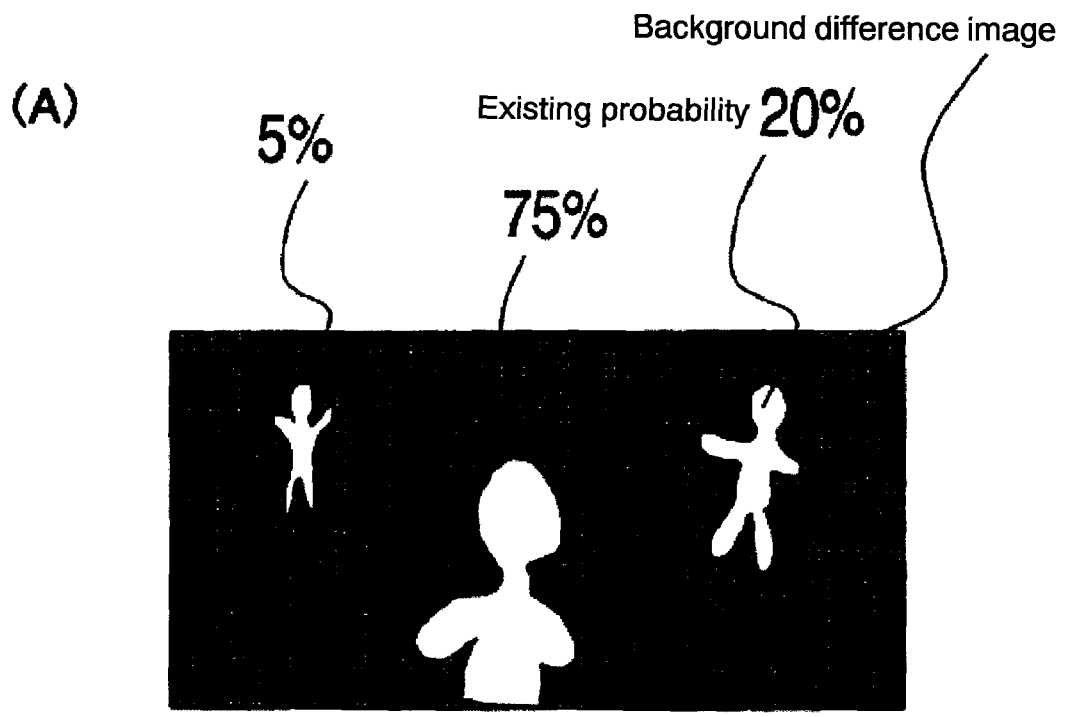
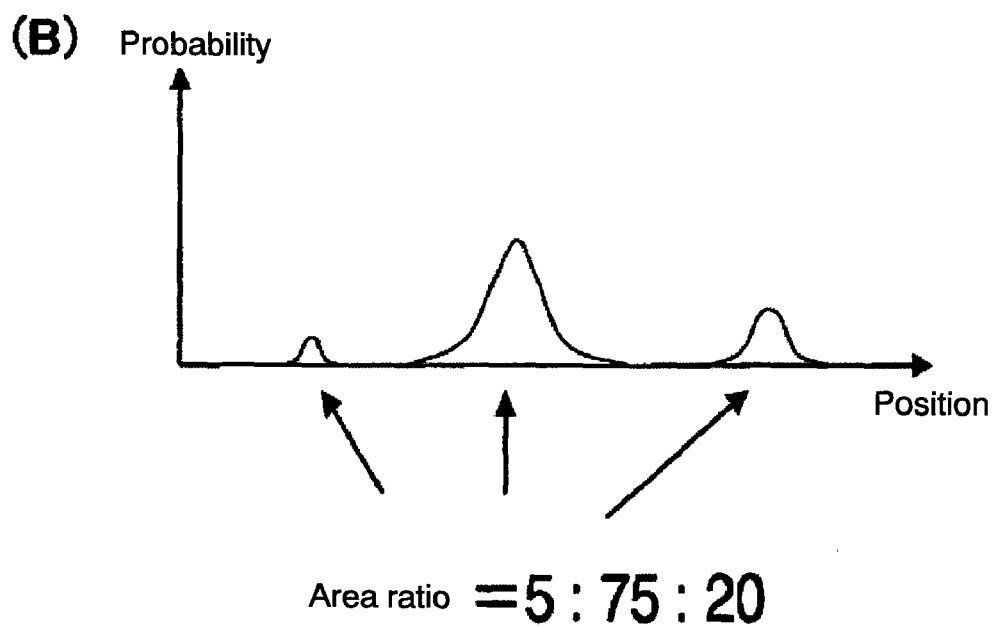

FIG.21
(A)
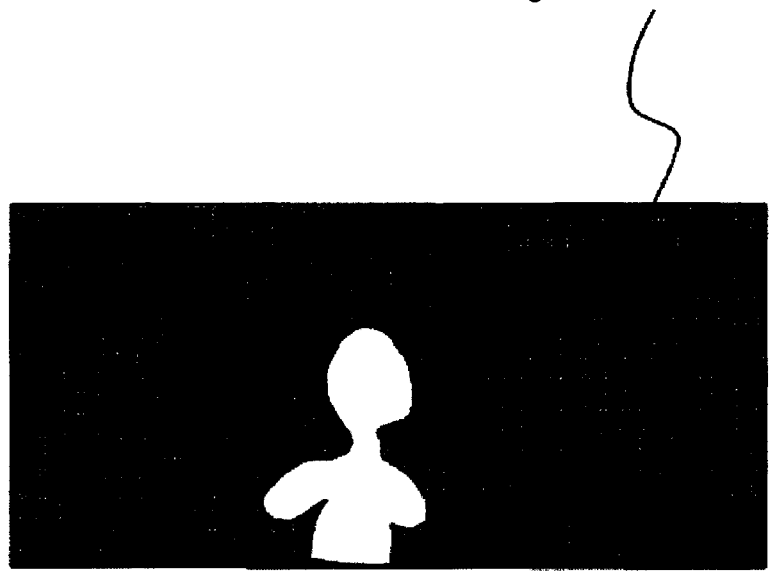
Background difference image
(B)
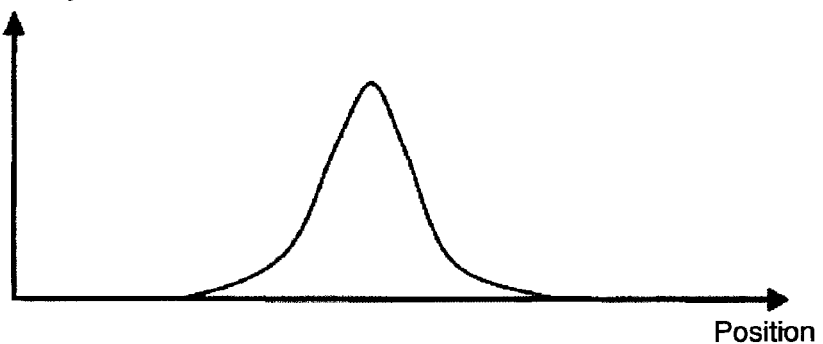
Probability
Position FIG.24
(A)
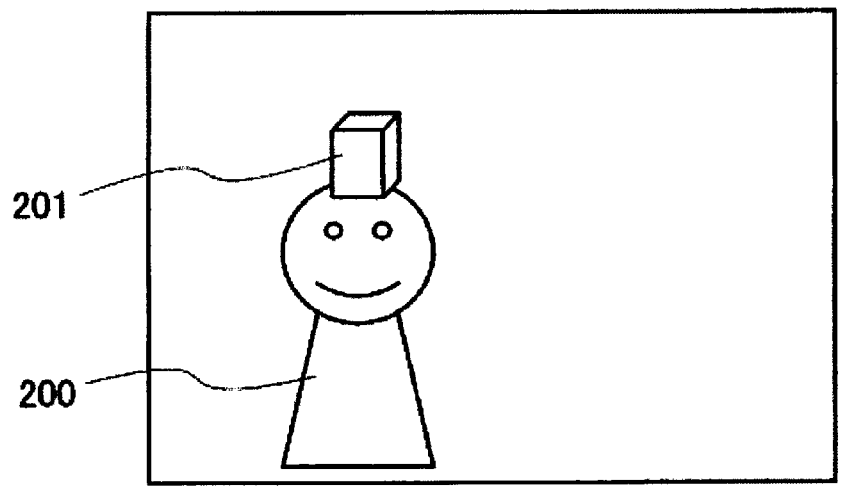
(B)
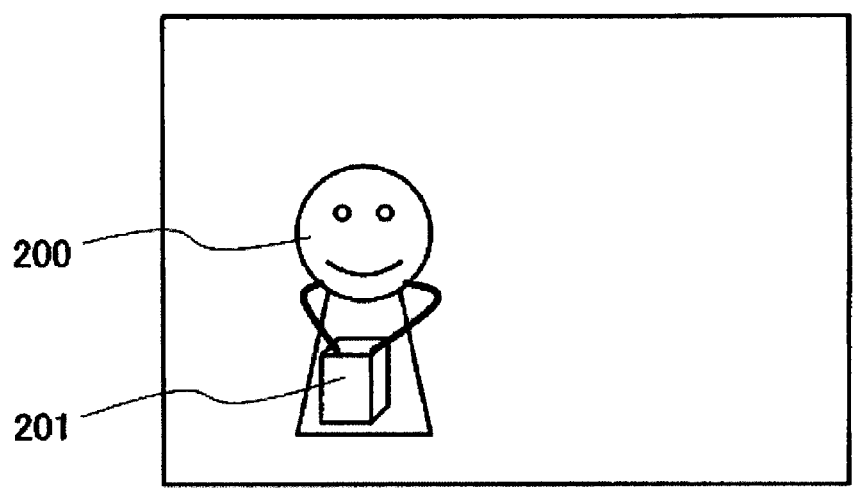

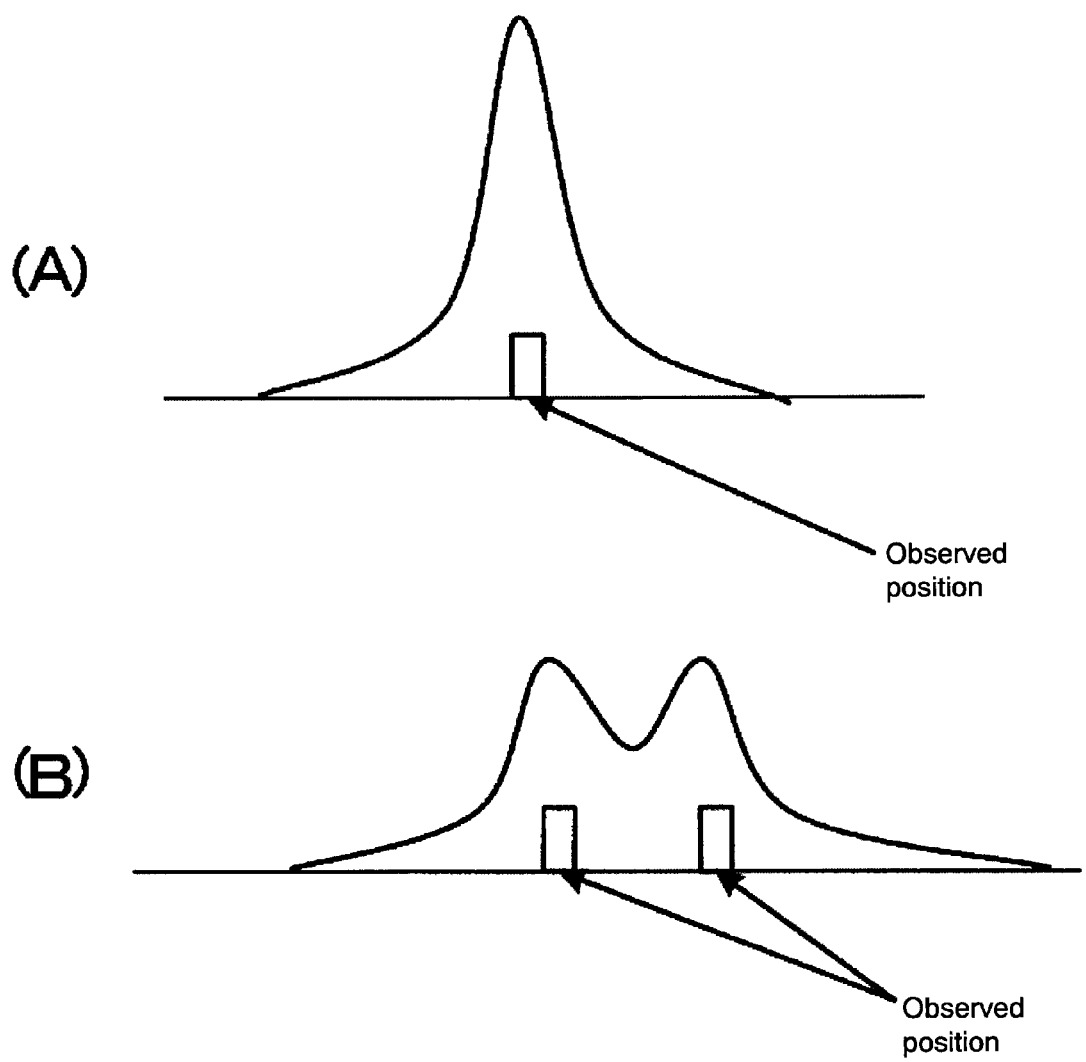

TAG SENSOR SYSTEM AND SENSOR DEVICE, AND OBJECT POSITION ESTIMATING DEVICE AND OBJECT POSITION ESTIMATING METHOD

TECHNICAL FIELD

The present invention relates to a position identifying system provided with a radio terminal device and a sensor device and, more particularly, to a technique to identify the position of a monitoring target by means of radio communication with the radio terminal device and using a picked-up image of the monitoring target. The present invention also relates to an object position estimating device and an object position estimating method for estimating the position of a target on the basis of the probability density of positioning coordinates.

BACKGROUND ART

Conventionally, there has been known a position sensing system that uses an RFID positioning device and a security camera. For example, Japanese Patent Laid-Open No. 2006-311111 discloses such a system as described above. In this conventional system, an authenticator has an active tag. The authenticator takes an image of an area being monitored using a security camera and detects the active tag using an RFID positioning device. Then, the position of a suspicious individual within the area is identified by comparing camera positioning data acquired using the security camera with RFID positioning data acquired using the RFID positioning device.

However, in the conventional system, there may be a case that, for example, a monitoring target enters a dead angle of the security camera and, therefore, the monitoring target cannot be imaged with the security camera and camera positioning data cannot be acquired. Thus, the system has not been able to specify the position of the monitoring target within an image and has had difficulty in keeping track of the movement of the monitoring target.

In addition, there has conventionally been a technique disclosed as this type of technique in, for example, Japanese Patent Laid-Open No. 2005-141687.

Japanese Patent Laid-Open No. 2005-141687 describes using the probability density distribution $P_t^V$ of the position of a target obtained from image information at time "t", the probability density distribution $P_t^A$ of the position of the target obtained from sound information at time "t", and a weighting factor $k_1(t)$, thereby evaluating a likelihood distribution "F", in which the probability density distribution $P_t^V$ and the probability density distribution $P_t^A$ are integrated, by Expression 1 shown below.

[Expression 1]

$$F = k_1(t) P_t^V + (1 - k_1(t)) P_t^A \quad \text{(Expression 1)}$$

In Japanese Patent Laid-Open No. 2005-141687, the weight of input information (image information or voice information) for the probability density distribution is increased with an increase in the maximum probability density value of the probability density distribution by setting a weighting factor $k_1(t)$ to a value expressed by Expression 2 shown below. Conversely, the weight of input information (image information or voice information) is decreased with a decrease in the maximum probability density value of the probability density distribution.

[Expression 2]

$$k_1(t) = \frac{\max(P_t^V(\phi))}{\max(P_t^V(\phi)) + \max(P_t^A(\phi))} \quad \text{(Expression 2)}$$

That is, the maximum probability density value of the probability density distribution is used as a guideline for reliability, in order to obtain a probability density distribution in which the probability density distribution of image information and the probability density distribution of voice information are integrated. Then, by estimating an object position from this integrated probability density distribution, it is possible to improve the accuracy of object position estimation.

Now an image of integration processing applied in Japanese Patent Laid-Open No. 2005-141687 will be described using FIG. 30.

FIG. 30(A) illustrates an example of a probability density distribution in a case where position coordinates of one point are obtained as observed position data (i.e., measurement results with respect to one certain event). FIG. 30(B) illustrates an example of a probability density distribution in a case where position coordinates of two points, identical to each other in the possibility of a target being present, are obtained as observed position data. Note that under normal circumstances, an object position on a two-dimensional plane is determined in object position estimation and, therefore, observed position data on a two-dimensional plane is obtained. Consequently, a probability density distribution determined from the observed position data is also distributed on a two-dimensional plane. For the sake of simplicity, however, FIG. 30 illustrates examples of positioning on a one-dimensional line segment. Also in examples to be described hereinafter, positioning on a two-dimensional plane may be explained using examples of positioning on a one-dimensional line segment for the sake of simplicity.

Here, assume, for example, that such observed position data as illustrated in FIG. 30(A) is obtained according to both image information and voice information and that a probability density distribution illustrated in FIG. 30(A) is obtained as a probability density distribution based on the observed position data. Then, the probability density distribution based on image information and the probability density distribution based on voice information are integrated using almost the same weighting factor.

On the other hand, assume, for example, that a probability density distribution based on image information is the one illustrated in FIG. 30(A). In addition, such observed position data as illustrated in FIG. 30(B) is obtained from voice information and a probability density distribution illustrated in FIG. 30(B) is obtained as a probability density distribution based on the observed position data. Then, the two probability density distributions are integrated using a weighting factor by which the probability density distribution obtained from voice information is multiplied and which is smaller than a weighting factor by which the probability density distribution obtained from image information is multiplied.

Incidentally, the technique disclosed in Japanese Patent Laid-Open No. 2005-141687 is such that a plurality of probability density distributions acquired with different sensors is integrated using weights according to reliability. Accordingly, the technique is considered to be certainly effective in improving the accuracy of object position estimation.

However, the weighting factors shown in Japanese Patent Laid-Open No. 2005-141687 are determined simply according to the maximum density in a probability density distribution. Consequently, if each probability density distribution itself serving as a source of integration is mistaken, then weighting itself is also mistaken. As a result, position estimating accuracy is also degraded.

DISCLOSURE OF THE INVENTION

Problems to be Solved by the Invention

The present invention has been accomplished under the above-described circumstances, and an object of the present invention is to provide a position identifying system capable of improving monitoring accuracy and reliably keeping track of a monitoring target using positioning information based on radio communication, even if positioning based on a picked-up image fails, while suppressing the power consumption of a radio communication terminal, such as an active tag.

In addition, the present invention has been accomplished under the above-described circumstances, and another object of the present invention is to provide an object position estimating device and an object position estimating method capable of improving position estimating accuracy in a case where the position of a target is estimated using probability density distributions.

Means for Solving the Problems

One aspect of the present invention is a position identifying system. This position identifying system is comprised of a radio terminal device carried by a monitoring target; and a sensor device provided with a radio communication unit for communicating by radio with the radio terminal device and an image pickup unit for taking an image of the monitoring target, wherein the radio terminal device is provided with a discrimination information retaining unit for retaining discrimination information specific to the radio terminal device and a transmission unit for transmitting a detection signal used to detect the position of the radio terminal device along with the discrimination information, and the sensor device is provided with a radio positioning unit for detecting the position of the radio terminal device on the basis of the detection signal containing the discrimination information received by the radio communication unit; an image positioning unit for calculating the position of the monitoring target on the basis of an image taken by the image pickup unit; and an integrated position identifying unit for identifying the position of the monitoring target by linking (i) the position calculated by the image positioning unit and (ii) the position detected by the radio positioning unit and the discrimination information.

Another aspect of the present invention is a sensor device. This sensor device is provided with a radio communication unit for communicating by radio with a radio terminal device carried by a monitoring target and used to transmit a detection signal along with discrimination information; an image pickup unit for taking an image of the monitoring target; a radio positioning unit for detecting the position of the radio terminal device on the basis of the detection signal containing the discrimination information received by the radio communication unit; an image positioning unit for calculating the position of the monitoring target on the basis of the image taken by the image pickup unit; and an integrated position identifying unit for identifying the position of the monitoring target by linking (i) the position calculated by the image positioning unit and (ii) the position detected by the radio positioning unit and the discrimination information.

Yet another aspect of the present invention is an object position estimating device. This object position estimating device is comprised of a first probability density distribution formation unit for forming a first probability density distribution with respect to coordinates of a target on the basis of a picked-up image taken by a camera; a second probability density distribution formation unit for forming a second probability density distribution with respect to coordinates of the target on the basis of a signal of a sensor attached to the target; a probability density integration unit for integrating the first probability density distribution and the second probability density distribution; a sensing unit for sensing the local circumstances of the target on the basis of the picked-up image; and a probability density distribution changing unit for changing the probability density distribution in the second probability density distribution formation unit or a weighting factor with respect to the second probability density distribution in the probability density integration unit according to the sensed local circumstances.

Still another aspect of the present invention is an object position estimating method. This object position estimating method includes: forming a first probability density distribution of a target from a picked-up image including the target; forming a second probability density distribution of the target on the basis of a signal of a sensor attached to the target; sensing the local circumstances of the target on the basis of the picked-up image; changing the second probability density distribution according to the sensed local circumstances; and integrating the first probability density distribution and the second probability density distribution.

As will be described hereinafter, there are other aspects of the present invention. Accordingly, this disclosure of the invention is intended to provide some aspects of the present invention and is not intended to restrict the scope of the invention described and claimed herein.

BRIEF DESCRIPTION OF THE DRAWINGS

FIG. 4 is an explanatory drawing of first discrimination information interpolation processing;

FIG. 5 is an explanatory drawing of image interpolation processing;

FIG. 9 is an explanatory drawing of second discrimination information interpolation processing;

FIG. 12 is a drawing illustrating one example of processing at time t2 in a position identifying unit;

FIG. 14 is a drawing of one example of correlation on the basis of candidate information with likelihood;

FIG. 20(A) is a drawing illustrating existing probabilities when three candidates for a target are detected from a picked-up image, whereas FIG. 20(B) is a drawing illustrating a probability density distribution;

FIG. 21(A) is a drawing illustrating an example when one candidate for a target is detected from a picked-up image, whereas FIG. 21(B) is a drawing illustrating a probability density distribution;

FIG. 23(A) is a drawing illustrating an example in which the variance value of a probability density distribution is decreased since an obstacle does not exist, whereas FIG. 23(B) is a drawing illustrating an example in which the variance value of a probability density distribution is increased since an obstacle exists;

FIG. 24(A) is a drawing illustrating a condition in which a wireless tag is placed on the head of a target, whereas FIG. 24(B) is a drawing illustrating a condition in which the wireless tag is hanged from the neck of the target;

FIG. 25(A) is an image drawing illustrating a picked-up image taken by a camera, whereas FIG. 25(B) is an image drawing illustrating that the picked-up image has been transformed into a plane map coordinate system;

FIG. 30(A) is a drawing illustrating an example of a probability density distribution when one observed position (i.e., measurement results with respect to one certain object) is obtained, whereas FIG. 30(B) is a drawing illustrating an example of a probability density distribution when two observed positions are obtained.

DESCRIPTION OF SYMBOLS

Figure 1:
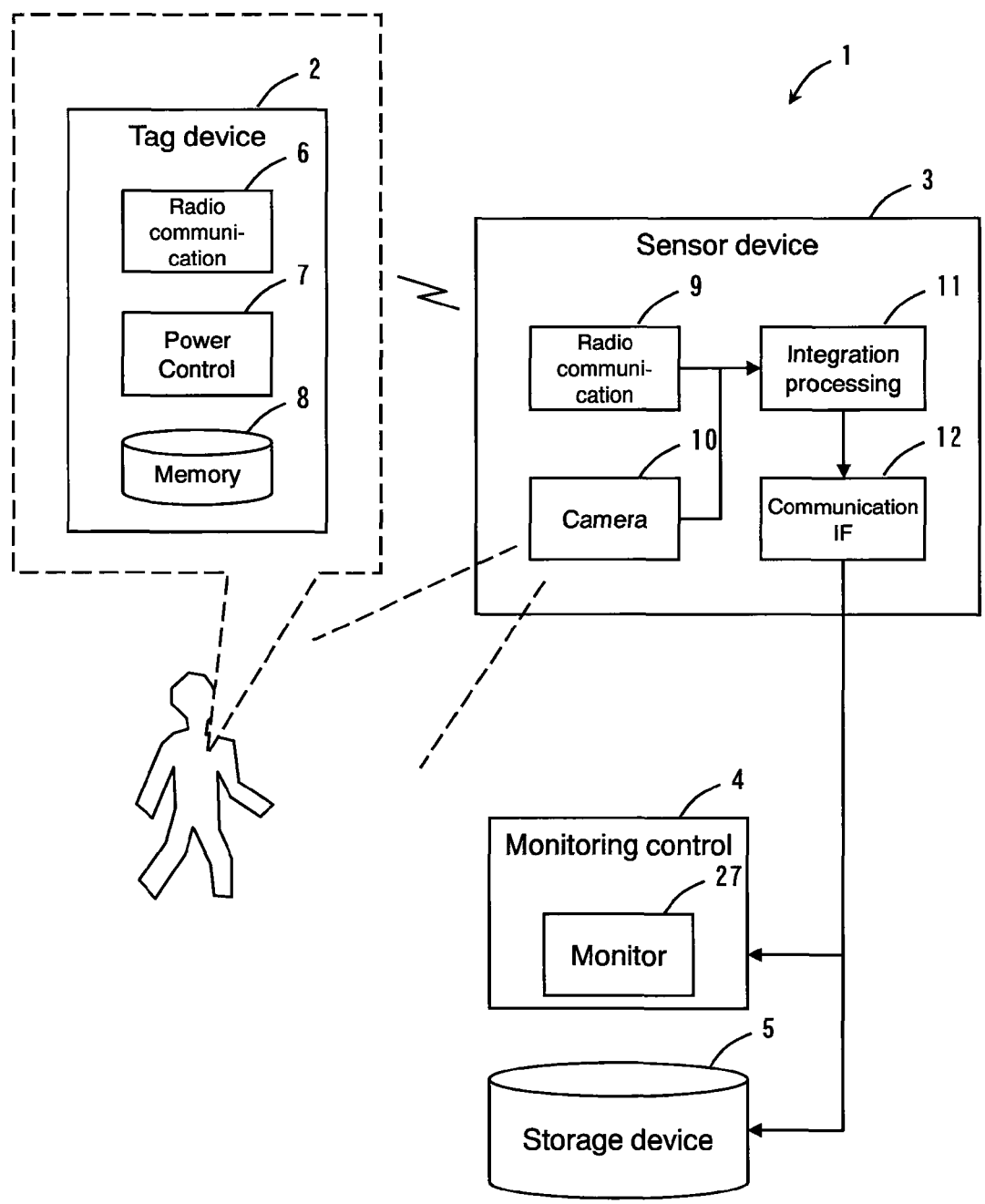
FIG. 1 is a block diagram illustrating a configuration of a position identifying system in the present embodiment.

1 Position identifying system
2 Tag device
3 Sensor device
6 Radio communication unit
7 Power control unit
8 Memory
9 Radio communication unit
10 Camera unit
11 Integration processing unit
14 Radio positioning unit
16 Image positioning unit
17 Position identifying unit
18 Interpolation processing unit
21 Image interpolating unit
22 Discrimination information interpolating unit
23 Position identification success/failure judgment unit
24 Image positioning success/failure judgment unit
25 Pause request unit
26 Transmission request unit
100 Object position estimating device
101 Camera
102 Picked-up image acquisition unit
103 Image coordinate probability density distribution formation unit
111 Tag signal receiver
112 Tag information acquisition unit
113 Tag coordinate probability density distribution formation unit
120 Probability density integration unit
121 Weight determination unit
122 Integration unit
130 Judgment unit
131 Tag situation sensing unit
132 Probability density distribution change control unit
200 Object
201 Wireless tag

BEST MODE FOR CARRYING OUT THE INVENTION

Hereinafter, the present invention will be described in detail. Note however that the detailed explanation given below and the drawings attached hereto do not restrict the invention. Instead, the scope of the invention is defined by the appended claims.

The position identifying system of the present invention has a configuration comprised of a radio terminal device carried by a monitoring target; and a sensor device including a radio communication unit for communicating by radio with the radio terminal device and an image pickup unit for taking an image of the monitoring target, wherein the radio terminal device is provided with a discrimination information retaining unit for retaining discrimination information specific to the radio terminal device and a transmission unit for transmitting a detection signal used to detect the position of the radio terminal device along with the discrimination information, and the sensor device is provided with a radio positioning unit for detecting the position of the radio terminal device on the basis of the detection signal containing the discrimination information received by the radio communication unit; an image positioning unit for calculating the position of the monitoring target on the basis of an image taken by the image pickup unit; and an integrated position identifying unit for identifying the position of the monitoring target by linking (i) the position calculated by the image positioning unit and (ii) the position detected by the radio positioning unit and the discrimination information.

According to this configuration, a position determined on the basis of a picked-up image (also referred to as an image position) and a position detected on the basis of a detection signal of the radio terminal device (also referred to as a tag position) are linked with each other and, thereby, the position of a monitoring target (a person to be monitored, an object to be monitored, or the like) is identified. In this case, the monitoring target carries the radio terminal device. Accordingly, once the position of the monitoring target is identified, the position of the monitoring target is detected on the basis of the detection signal of the radio terminal device even if the monitoring target may not be imaged in some cases thereafter. Thus, it is possible to keep track of the movement of the monitoring target.

In addition, in the position identifying system of the present invention, the sensor device may have a configuration comprised of a position identification success/failure judgment unit for determining success/failure in identifying the position of the monitoring target by the integrated position identifying unit; and a pause request unit for transmitting a transmission pause request for decreasing the frequency of detection signal transmission to the radio terminal device when a determination is made in the position identification success/failure judgment unit that identifying the position of the monitoring target has succeeded.

According to this configuration, the radio terminal device halts transmission of the detection signal if the position of the monitoring target is identified by the linking (also referred to as integration) of an image position and a tag position with each other. Consequently, it is possible to reduce the power consumption of the radio terminal device. In this case, the position of the monitoring target is calculated on the basis of a picked-up image and, therefore, it is possible to keep track of the movement of the monitoring target. In a conventional system, the power consumption of an active tag is not taken into consideration. Accordingly, the conventional system has had the problem that the battery of the active tag does not last long when human tracking is performed by constantly comparing camera positioning data with RFID positioning data. In contrast, according to the position identifying system of the present invention, it is possible to suppress the power consumption of the radio terminal device as much as possible.

In addition, in the position identifying system of the present invention, the sensor device may have a configuration comprised of an image positioning success/failure judgment unit for determining success/failure in the image positioning of the monitoring target by the image positioning unit; and a first transmission request unit for transmitting a detection signal transmission request to the radio terminal device if a determination is made in the image positioning success/failure judgment unit that the image positioning of the monitoring target has failed.

According to this configuration, if the position of the monitoring target cannot be calculated on the basis of the picked-up image (i.e., if the monitoring target is lost), the radio terminal device restarts transmitting a detection signal. Consequently, if the monitoring target cannot be imaged, the position of the monitoring target is detected on the basis of the detection signal of the radio terminal device. Thus, it is possible to continue to keep track of the movement of the monitoring target.

In addition, in the position identifying system of the present invention, the sensor device may have a configuration comprised of a second transmission request unit for transmitting a detection signal transmission request to the radio terminal device, when a determination is made in the position identification success/failure judgment unit that identifying the position of the monitoring target has failed after the transmission of the transmission pause request.

According to this configuration, if the position of the monitoring target cannot be identified by the integrated position identifying unit after the frequency of detection signal transmission by the tag device is decreased, the radio terminal device is caused to transmit a detection signal. Consequently, if identifying the position of the monitoring target has failed, the position of the monitoring target is detected on the basis of the detection signal of the radio terminal device. Thus, it is possible to continue to keep track of the movement of the monitoring target.

In addition, in the position identifying system of the present invention, the sensor device may have a configuration comprised of a first discrimination information interpolating unit for once again attaching the discrimination information of the radio terminal device linked with the monitoring target to the image of the monitoring target for which the integrated position identifying unit has failed in position identification in the integrated position identifying unit, if a determination is made that identifying the position of the monitoring target by the integrated position identifying unit has once again succeeded after a determination is made in the position identification success/failure judgment unit that identifying the position of the monitoring target by the integrated position identifying unit has failed.

According to this configuration, if the discrimination information is not correctly attached to the monitoring target (e.g., immediately after a plurality of monitoring targets passes each other), the discrimination information provided as the result of success in subsequently identifying (integrating) the position of the monitoring target is retrospectively attached to the image for which the integrated position identifying unit failed in position identification. Consequently, it is possible to continuously know the movement of the monitoring target.

In addition, in the position identifying system of the present invention, the sensor device may have a configuration comprised of an image interpolating unit for interpolating the image of the monitoring target at the time of failure in image positioning on the basis of a position obtained by previous image positioning and a position obtained by the latest image positioning, if image positioning has once again succeeded after a failure in the image positioning of the monitoring target.

According to this configuration, even if the position of the monitoring target has not been able to be calculated on the basis of a picked-up image, positions and images between images earlier and later than the picked-up image are interpolated on the basis of the earlier and later images. Consequently, it is possible to continuously know the movement of the monitoring target.

In addition, in the position identifying system of the present invention, the frequency of detection signal transmission by the radio terminal device and the frequency of the radio positioning of the radio terminal device by the radio positioning unit are set lower than the frequency of the image positioning of the monitoring target by the image positioning unit, and the sensor device may have a configuration comprised of a second discrimination information interpolating unit for attaching the discrimination information of the radio terminal device linked with the image of the monitoring target by the integrated position identifying unit at the time or after the position of the monitoring target is identified, to an image of the monitoring target within an image taken by the image pickup unit before the position identification of the monitoring target by the integrated position identifying unit.

According to this configuration, it is possible to reduce the power consumption of the radio terminal device by decreasing the frequency of detection signal transmission by the radio terminal device. In this case, there may arise a difference between a timing at which a position based on a picked-up image (image position) is calculated and a timing at which a position based on the detection signal of the radio terminal device (tag position) is detected. For example, in some cases, the tag position may not be detected before the position identification of the monitoring target (linking of the image position, the tag position and the discrimination information with one another) and only the image position may be calculated. In such cases, the discrimination information of the monitoring target within an image before the identification of the position of the monitoring target is attached (retroactively) on the basis of an image position and a tag position after the identification of the position of the monitoring target. Consequently, it is possible to continuously know the movement of the monitoring target.

In addition, the position identifying system of the present invention may be comprised of a correlation unit for correlating the image positioning and radio positioning results of the monitoring target on the basis of a distance between a position calculated by the image positioning unit and a position detected by the radio positioning unit.

According to this configuration, it is possible to appropriately correlate the image positioning and radio positioning results of the monitoring target on the basis of the distance between the position calculated by the image positioning unit (image position) and the position detected by the radio positioning unit (tag position). For example, if the image position and the tag position are close to each other, then the image positioning and radio positioning results are regarded as those of the same monitoring target and are correlated accordingly. Consequently, the accuracy of identifying the position of the monitoring target is improved.

In addition, in the position identifying system of the present invention, the correlation unit may correlate the image positioning and radio positioning results of the monitoring target when a position detected by the radio positioning unit exists within a predetermined search area centered on a position calculated by the image positioning unit.

According to this configuration, when the position detected by the radio positioning unit (tag position) exists within a predetermined search area (e.g., within a predetermined radius) centered on the position calculated by the image positioning unit (image position), the image positioning and radio positioning results of the monitoring target are regarded as those of one and the same monitoring target and are correlated appropriately.

In addition, in the position identifying system of the present invention, the correlation unit may correlate the image positioning and radio positioning results of the monitoring target when a position calculated by the image positioning unit exists within a predetermined search area centered on the position detected by the radio positioning unit.

According to this configuration, when the position calculated by the image positioning unit (image position) exists within a predetermined search area (e.g., within a predetermined radius) centered on the position detected by the radio positioning unit (tag position), the image positioning and radio positioning results of the monitoring target are regarded as those of one and the same monitoring target and are correlated appropriately.

In addition, the position identifying system of the present invention may be comprised of a positioning accuracy comparison unit for comparing the positioning accuracy of the image positioning of the monitoring target with the positioning accuracy of the radio positioning thereof and, on the basis of the results of positioning accuracy comparison, the correlation unit may correlate the image positioning and radio positioning results of the monitoring target when the position detected by the radio positioning unit exists within the predetermined search area centered on the position calculated by the image positioning unit, if the positioning accuracy of the image positioning is higher, or may correlate the image positioning and radio positioning results of the monitoring target when the position calculated by the image positioning unit exists within the predetermined search area centered on the position detected by the radio positioning unit, if the positioning accuracy of the radio positioning is higher.

According to this configuration, a comparison is made between the image positioning accuracy and the radio positioning accuracy and, when the position determined at lower positioning accuracy exists within the predetermined search area (e.g., within a predetermined radius) centered on the position determined at higher positioning accuracy, the image positioning and radio positioning results of the monitoring target are regarded as those of one and the same monitoring target and are correlated appropriately.

In addition, in the position identifying system of the present invention, the size of the predetermined search area centered on the position calculated by the image positioning unit may be set according to the image positioning accuracy of the monitoring target.

According to this configuration, the size of the search area centered on the position calculated by the image positioning unit is set appropriately, according to the image positioning accuracy of the monitoring target. For example, if the positioning accuracy is high, the size of the search area is set small and, if the positioning accuracy is low, the size of the search area is set large.

In addition, the position identifying system of the present invention may be comprised of a history retaining unit for retaining information on the plurality of positions as candidate information when a plurality of positions detected by the radio positioning unit exists within the predetermined search area centered on the position calculated by the image positioning unit.

According to this configuration, when a plurality of positions detected by the radio positioning unit (tag positions) exists within the predetermined search area centered on the position calculated by the image positioning unit (image position), it is possible to deal with the information on the plurality of positions as candidate information.

In addition, in the position identifying system of the present invention, the correlation unit may correlate the image positioning and radio positioning results of the monitoring target on the basis of the candidate information retained by the history retaining unit.

According to this configuration, when a plurality of positions detected by the radio positioning unit (tag positions) exists within the predetermined search area centered on the position calculated by the image positioning unit, it is possible to appropriately correlate the image positioning and radio positioning results of the monitoring target on the basis of the candidate information retained by the history retaining unit.

In addition, in the position identifying system of the present invention, the size of the predetermined search area centered on the position calculated by the radio positioning unit may be set according to the radio positioning accuracy of the monitoring target.

According to this configuration, the size of the search area centered on the position calculated by the radio positioning unit is set appropriately, according to the radio positioning accuracy of the monitoring target. For example, if the positioning accuracy is high, the size of the search area is set small and, if the positioning accuracy is low, the size of the search area is set large.

In addition, the position identifying system of the present invention may be comprised of a history retaining unit for retaining information on a plurality of positions as candidate information when the plurality of positions detected by the image positioning unit exists within the predetermined search area centered on the position calculated by the radio positioning unit.

According to this configuration, when a plurality of positions detected by the image positioning unit (image positions) exists within the predetermined search area centered on the position calculated by the radio positioning unit (tag position), it is possible to deal with the information on the plurality of positions as candidate information.

In addition, in the position identifying system of the present invention, the correlation unit may correlate the radio positioning and image positioning results of the monitoring target on the basis of the candidate information retained by the history retaining unit.

According to this configuration, when the plurality of positions detected by the image positioning unit (image positions) exists within the predetermined search area centered on the position calculated by the radio positioning unit (tag position), it is possible to appropriately correlate the radio positioning and image positioning results of the monitoring target on the basis of the candidate information retained by the history retaining unit.

In addition, in the position identifying system of the present invention, the correlation unit may be comprised of a combinational calculation unit for calculating a combination in which a square sum of differences in distance between a position calculated by the image positioning unit and a position detected by the radio positioning unit is minimum.

According to this configuration, a combination in which a square sum of differences in distance between a position calculated by the image positioning unit (image position) and a position detected by the radio positioning unit (tag position) is minimum is calculated and used to correlate the image positioning and radio positioning results of the monitoring target. Consequently, it is possible to appropriately correlate the image positioning and radio positioning results of the monitoring target.

In addition, in the position identifying system of the present invention, the integrated position identifying unit may decide an average of positions calculated by the image positioning unit and detected by the radio positioning unit as the position of the monitoring target.

According to this configuration, an average of positions calculated by the image positioning unit and detected by the radio positioning unit is decided as the position of the monitoring target. Consequently, the position of the monitoring target is identified appropriately.

In addition, in the position identifying system of the present invention, the average may be a weighted average according to the image positioning and radio positioning accuracies of the monitoring target.

According to this configuration, the position of the monitoring target is identified appropriately using a weighted average according to the image positioning and radio positioning accuracies of the monitoring target.

In addition, in the position identifying system of the present invention, positions calculated by the image positioning unit and detected by the radio positioning unit are located within a cellular space divided into a plurality of cells, and the position identifying system may be comprised of a correlation unit for correlating the image positioning and radio positioning results of the monitoring target on the basis of a positional relationship between a cell to which the position calculated by the image positioning unit belongs and a cell to which the position detected by the radio positioning unit belongs.

According to this configuration, it is possible to appropriately correlate the image positioning and radio positioning results of the monitoring target on the basis of a positional relationship between a cell to which the position calculated by the image positioning unit (image position) belongs and a cell to which the position detected by the radio positioning unit (tag position) belongs. For example, if the image position and the tag position belong to the same cell, then the image positioning and radio positioning results are regarded as those of the same monitoring target and are correlated accordingly. Consequently, it is possible to reduce a calculation amount and increase processing speed, compared with a case in which distance calculations are performed for all image positions and tag positions.

In addition, the position identifying system of the present invention may be comprised of a warning unit for performing a process of issuing a warning when a position detected by the radio positioning unit does not exist within a predetermined search area centered on a position calculated by the image positioning unit.

According to this configuration, if a position detected by the radio positioning unit (tag position) does not exist within a predetermined search area (e.g., within a predetermined radius) centered on a position calculated by the image positioning unit (image position), it is possible to issue a warning to call a user's attention.

The sensor device of the present invention has a configuration comprised of: a radio communication unit for communicating by radio with a radio terminal device carried by a monitoring target and used to transmit a detection signal along with discrimination information; an image pickup unit for taking an image of the monitoring target; a radio positioning unit for detecting the position of the radio terminal device on the basis of the detection signal containing the discrimination information received by the radio communication unit; an image positioning unit for calculating the position of the monitoring target on the basis of the image taken by the image pickup unit; and an integrated position identifying unit for identifying the position of the monitoring target by linking (i) the position calculated by the image positioning unit and (ii) the position detected by the radio positioning unit and the discrimination information.

Also according to this configuration, a position calculated on the basis of a picked-up image (image position) and a position detected on the basis of the detection signal of the radio terminal device (tag position) are linked with each other in the same way as in the above-described system, and the position of a monitoring target (a person to be monitored, an object to be monitored, or the like) is identified. In this case, the monitoring target carries the radio terminal device. Accordingly, once the position of the monitoring target is identified, the position of the monitoring target is detected on the basis of the detection signal of the radio terminal device even if the monitoring target may not be imaged in some cases thereafter. Thus, it is possible to keep track of the movement of the monitoring target.

The present invention makes it possible to identify the position of the monitoring target and keep track of the movement thereof by linking a position calculated on the basis of a picked-up image (image position) and a position detected on the basis of the detection signal of the radio terminal device (tag position) with each other, even if the monitoring target cannot be imaged.

In addition, one aspect of the object position estimating device of the present invention employs a configuration comprised of: a first probability density distribution formation unit for forming a first probability density distribution with respect to coordinates of a target on the basis of a picked-up image taken by a camera; a second probability density distribution formation unit for forming a second probability density distribution with respect to coordinates of the target on the basis of a signal of a sensor attached to the target; a probability density integration unit for integrating the first probability density distribution and the second probability density distribution; a sensing unit for sensing the local circumstances of the target on the basis of the picked-up image; and a probability density distribution changing unit for changing, according to the sensed local circumstances, the probability density distribution in the second probability density distribution formation unit or a weighting factor with respect to the second probability density distribution in the probability density integration unit.

In addition, one aspect of the object position estimating method of the present invention includes: forming a first probability density distribution of a target from a picked-up image including the target; forming a second probability density distribution of the target on the basis of a signal of a sensor attached to the target; sensing the local circumstances of the target on the basis of the picked-up image; changing the second probability density distribution according to the sensed local circumstances; and integrating the first probability density distribution and the second probability density distribution.

According to the present invention, the local circumstances of a target are sensed from a picked-up image and a probability density distribution in a second probability density distribution is changed according to the sensed local circumstances. Consequently, by effectively utilizing the picked-up image, it is possible to make the second probability density distribution itself serving as a source of integration even closer to a real one. As a result, it is possible to improve position estimating accuracy.

(Position Identifying System)

Hereinafter, a position identifying system in accordance with an embodiment of the present invention will be described using the accompanying drawings. This position identifying system is used as, for example, a factory work efficiency promoting system for analyzing the flow line of personnel in a factory to improve work efficiency, a distribution warehouse loss monitoring system for constantly monitoring the movement of personnel within a warehouse area to early detect, prevent and record loss accidents within a warehouse, mistaken delivery accidents and the like, an office entrance/exit management system for automatically recording the history of office entrance and exit, and the like. However, the purposes of use of the position identifying system are not limited to these applications.

Figure 2:
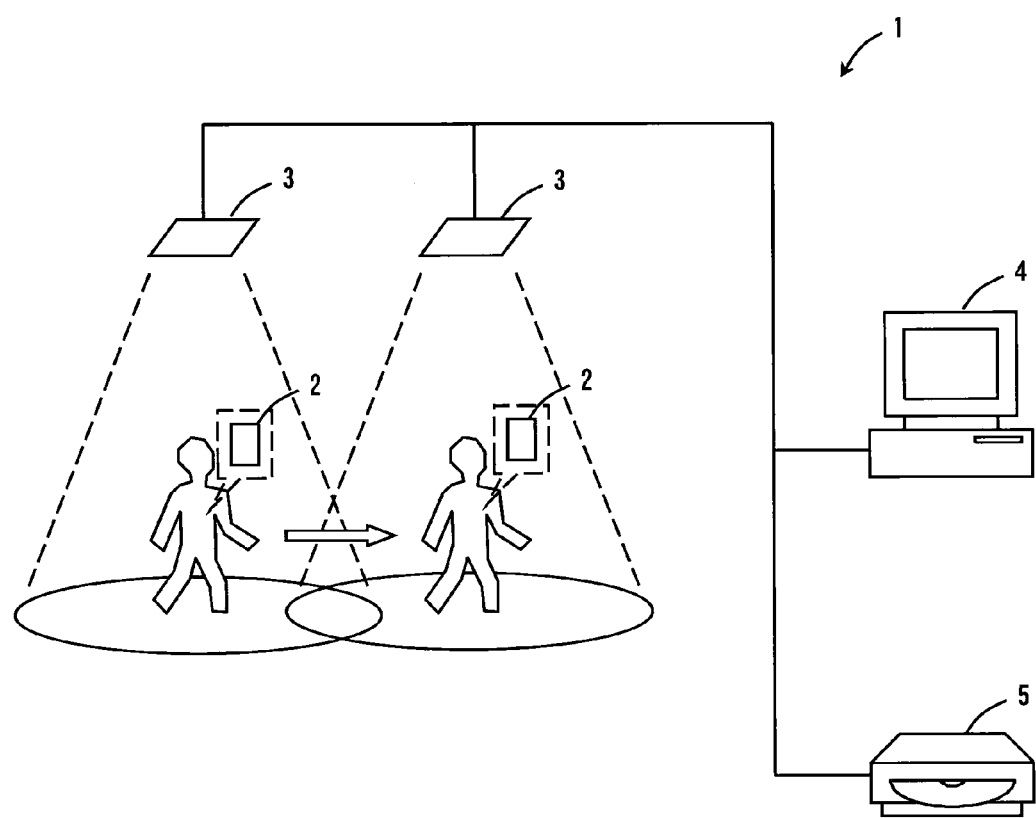
FIG. 2 is a diagram used to explain an overview of the position identifying system in the present embodiment.

Now the configuration of a position identifying system of the present embodiment will be described using FIGS. 1 to 3. FIG. 1 is a block diagram illustrating the configuration of the position identifying system. FIG. 2 is an explanatory drawing illustrating the overview of the position identifying system.

First, the overall configuration of a position identifying system 1 will be described with reference to FIGS. 1 and 2. As illustrated in FIG. 2, the position identifying system 1 is comprised of a tag device 2 serving as a radio terminal device carried by a monitoring target (e.g., a person to be monitored) and a sensor device 3 installed in a monitoring area. The sensor device 3 is connected to a monitoring control device 4 and a storage device 5 installed in a monitoring room.

The sensor device 3 has a circular monitoring area (also referred to as a sensing area) having a radius of, for example, 10 m. The monitoring control device 4 is, for example, a control computer and the storage device 5 is, for example, an HDD. Note that the sensor device 3 may be comprised of an internal memory unit (including a recording medium, such as a memory card), in addition to an external memory unit such as the storage device 5.

Note that one tag device 2 and two sensor devices 3 are illustrated in FIG. 2 for convenience of explanation. However, this position identifying system 1 is comprised of a plurality of tag devices 2 and a plurality of sensor devices 3. That is, in the present embodiment, a plurality of persons to be monitored carries tag devices 2 respectively and a plurality of sensor devices 3 is installed respectively in a plurality of places in the monitoring area.

As illustrated in FIG. 1, the tag device 2 is provided with a radio communication unit 6 for communicating by radio with the sensor device 3 and a power control unit 7 for performing power control on a power supply. Here, this radio communication unit 6 corresponds to the radio communication unit of the present invention. In addition, a signal for detecting the position of the tag device 2 (detection signal) is transmitted from the radio communication unit 6. Accordingly, this radio communication unit 6 also corresponds to the transmission unit of the present invention.

This tag device 2 is, for example, an active tag, a semi-passive tag, or the like. The tag device 2 is provided with a memory 8 retaining a specific identifier (also referred to as a discrimination ID). The tag device 2 can read out the discrimination ID retained in the memory 8, according to a transmission request from the sensor device 3, and transmit a detection signal containing the discrimination ID to the sensor device 3. Alternatively, the tag device 2 can be configured so that a signal for notifying the discrimination ID only is provided separately in addition to the detection signal. Then, the tag device 2 transmits the signal for notifying the discrimination ID according to a discrimination ID transmission request received from the sensor device 3, and transmits the detection signal according to a detection signal transmission request. A surveillant can recognize the properties and the position of a carrier of the tag device 2 (person to be monitored) on the basis of a signal which the sensor device 3 receives from the tag device 2.

The sensor device 3 is provided with: a radio communication unit 9 for communicating by radio with the tag device 2 to perform wireless positioning; a camera unit 10 for taking an image of a person to be monitored to perform image-based positioning; an integration processing unit 11 for performing the integration processing (to be described later) of the positions of the person to be monitored respectively measured by the radio communication unit 9 and the camera unit 10; and a communication IF unit 12 for outputting data on the results of integration processing to an external device (monitoring control device 4, storage device 5, or the like).

Figure 3:
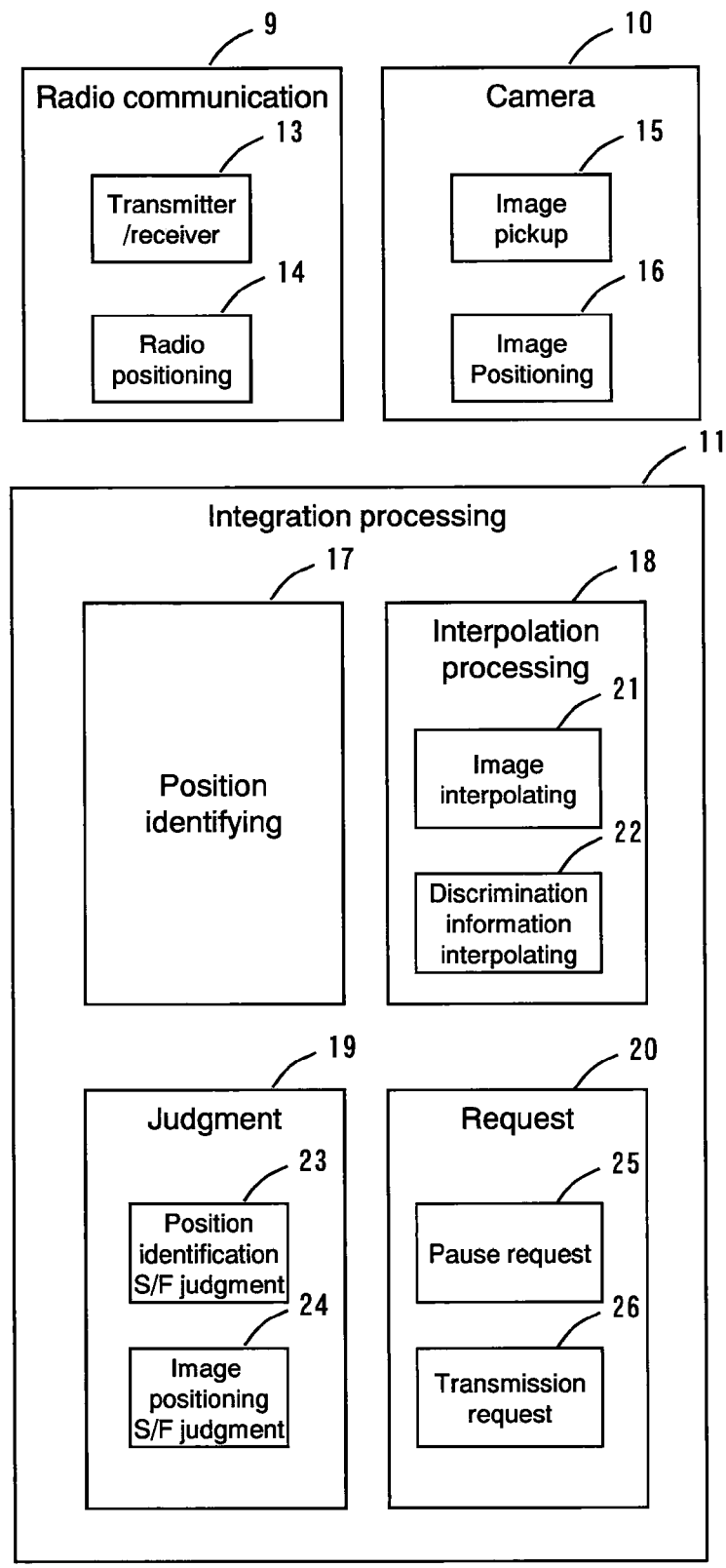
FIG. 3 is a block diagram illustrating the respective constituent elements of a sensor device in the present embodiment.

FIG. 3 is a block diagram used to describe the respective constituent elements of the sensor device 3 in further detail. The radio communication unit 9 is provided with a transmitter/receiver unit 13 and a radio positioning unit 14. The transmitter/receiver unit 13 transmits a detection signal transmission request to the tag device 2, and receives a detection signal (signal containing the discrimination ID of the tag device 2) transmitted by the tag device 2 which has received this transmission request. The radio positioning unit 14 determines the relative position of the tag device 2, which has transmitted the detection signal, in a three-dimensional manner using information available from the detection signal received by the transmitter/receiver unit 13, such as a radio field strength, a radio wave arrival direction, a radio wave propagation time, and the like. In addition, the radio positioning unit 14 outputs three-dimensional coordinate data as positioning results and the discrimination ID of the tag device 2 taken out of the detection signal.

In the present embodiment, the radio communication unit 9 outputs the following data items to the integration processing unit 11.

(1) Time data showing the time when a detection signal is received from a tag device (e.g., day, hour, minute, second)
(2) Identification ID of tag device
(3) Three-dimensional coordinate data of positioned tag device (three-dimensional position coordinates in real space)

The camera unit 10 is provided with an image pickup unit 15 and an image positioning unit 16. As the image pickup unit 15, it is possible to use, for example, a stereo camera capable of taking an ultrawide-angle (e.g., 360°) image of an area having a certain radius (e.g., 10 m). The image positioning unit 16 detects and extracts the image area of a plurality of persons (persons to be monitored) included in an image taken by the image pickup unit 15, measures three-dimensional coordinates ranging from the sensor device 3 to the persons, and outputs the three-dimensional coordinates. For a positioning method using images, it is possible to use, for example, a depth estimation method based on binocular disparity information available from a stereo image.

In the present embodiment, the camera unit 10 outputs the following data items to the integration processing unit 11.

(1) Image data
(2) Image area of human object in an image (e.g., an area enclosed by the outline of a person in the image, or a quadrangular area circumscribed around the person in the image)
(3) Representative point in the image area of human object (e.g., gravity center of the image area)
(3) Time data (e.g., frame number of picked-up image)
(4) Three-dimensional coordinate data (three-dimensional position coordinates in real space) obtained by image positioning In addition, as illustrated in FIG. 3, the integration processing unit 11 is provided with a position identifying unit 17, an interpolation processing unit 18, a judgment unit 19, and a request unit 20. In this integration processing unit 11, data output respectively from the radio communication unit 9 and the camera unit 10 is integrated and processing for identifying the position of the monitoring target and discrimination information is performed, while performing control so as to suppress the power consumption of the tag device 2 as much as possible.

The position identifying unit 17 correlates the positional data of the tag device 2 output from the radio communication unit 9 with the positional data of the image area of a human object in an image output from the camera unit 8, thereby linking the discrimination ID of the tag device 2 with the image area of the human object and identifying the position of the person to be monitored and the discrimination information.

The interpolation processing unit 18 is provided with an image interpolating unit 21 for interpolating the position and the image of the person to be monitored and a discrimination information interpolating unit 22 for interpolating the discrimination information of the person to be monitored. Note that the details of these image interpolation processing and discrimination information interpolation processing will be described later.

The judgment unit 19 is provided with a position identification success/failure judgment unit 23 for determining whether or not the position of the person to be monitored has been identified by the position identifying unit 17 and an image positioning success/failure judgment unit 24 for determining whether or not the image positioning of the position of the person to be monitored by the camera unit 10 has succeeded.

The request unit 20 is provided with a pause request unit 25 for transmitting a pause request to the tag device 2 (request to halt detection signal transmission) if a determination is made by the position identification success/failure judgment unit 23 that the position identification of the person to be monitored by the position identifying unit 17 has succeeded; and a transmission request unit 26 for transmitting a transmission request (detection signal transmission request) to the tag device 2 if a determination is made by the image positioning success/failure judgment unit 24 that the image positioning of the position of the person to be monitored by the camera unit 10 has failed and if a determination is made by the position identification success/failure judgment unit 23 that the position identification of the person to be monitored by the position identifying unit 17 has failed.

In the present embodiment, the integration processing unit 11 outputs the following data items to the communication IF unit 12. Here, data items (2) to (6) can also be said to be data items indicative of the properties of an image frame.

(1) Discrimination ID of sensor device
(2) Time data (e.g., day, hour, minute, second)
(3) Frame image data
(4) Image area of human object
(5) Representative point in the image area of human object
(5) Discrimination ID of tag device
(6) Degree of integration (e.g., T: Only coordinates provided by tag-based measurement, D: Only representative point provided by image-based calculation, C: Both coordinates provided by tag-based measurement and representative point provided by image-based calculation, P: Coordinates provided by interpolation calculation or by estimation calculation)

The monitoring control device 4 is provided with a monitor 27 for displaying a monitoring target. In addition, this monitoring control device 4 is provided with: a function for generating a flow line image on the basis of human object information output by the sensor device 3; a function for setting and controlling the operation of the sensor device 3; and a function for executing various applications (e.g., applications for a factory work efficiency promoting system, a distribution warehouse loss monitoring system, an office entrance/exit management system, and the like).

Now the operation of a position identifying system 1 configured as described above will be explained using drawings. Here, an explanation will be made with a focus on the characteristic operations of the present invention.

(Interpolation Processing)

First, an explanation will be made of the interpolation processing of the position of a person to be monitored. FIGS. 4 and 5 are drawings (schematic views of the display screen of the monitor 27) used to explain interpolation processing. Examples shown in FIGS. 4 and 5 illustrate conditions in which one person to be monitored (who carries a tag device 2 having a discrimination ID of "ID: 1") gradually moves from the left-hand side of the screen, through the middle of the screen, to the right-hand side of the screen.

In FIG. 4, a person to be monitored for whom position identification by the position identifying unit 17 has succeeded, that is, to whom the discrimination ID of the tag device 2 is allocated is shown by diagonal lines, and a person to be monitored for whom position identification has failed is shown by a dashed outline. That is, in this example, the position identification of the person to be monitored has succeeded when the person to be monitored is positioned on the left-hand and right-hand sides of the screen, and the position identification of the person to be monitored has failed when the person to be monitored is positioned in the middle of the screen. A determination as to success/failure in identifying the position of the monitoring target is made by the position identification success/failure judgment unit 22.

Examples of failure in identifying the position of the person to be monitored include cases where integration with tag-based positioning data is not possible and a discrimination ID cannot be attached to a picked-up image, including a case where the person to be monitored is placed under cover or walks past another person. The examples also include a case where for the above-described reasons, it has not been possible to create an image area of the human object of the person to be monitored (an area enclosed by an outline or a circumscribed quadrangular area). That is, if the person to be monitored has disappeared from view (or has been lost), a determination is made that the identification of the person to be monitored has failed.

As described above, even if integrating the positions of the person to be monitored fails once, it is possible to retroactively correlate the discrimination information of the tag device 2 also with an image of the monitoring target at the time of failure in integration (first discrimination information interpolation processing), as long as positions of the person to be monitored imaged by the camera unit 10 and detected by radio communication with the tag device 2 can be reintegrated and correlated once again. Thus, it is possible to retroactively keep track of the position of the person to be monitored. In this example, "ID: 1" which is the discrimination ID of the tag device 2 detected by the radio communication unit 9 is retroactively allocated also when the person to be monitored is positioned in the middle of the screen. Thus, it is possible to correlate the discrimination information of the tag device 2 also with the image at the time of failure in integration. This first discrimination information interpolation processing is carried out in the discrimination information interpolating unit 22. Accordingly, this discrimination information interpolating unit 22 corresponds to the first discrimination information interpolating unit of the present invention.

In addition, as illustrated in FIG. 5, it is possible to perform a process of interpolating the image of the person to be monitored, whose sight has been lost at the camera unit 10, using images before and after the loss (image interpolation processing) if imaging the person to be monitored has failed.

In the example of FIG. 5, the image of the person to be monitored (the image of the person to be monitored in the middle of the screen), whose sight has been lost at the camera unit 10, is generated by image interpolation processing on the basis of the images before and after the loss (images of the person to be monitored on the left-hand and right-hand sides of the screen). Consequently, it is possible to interpolate the image area of the monitoring target within an image at the time of failure in image positioning. This image interpolation processing is carried out in the image interpolating unit 21. Accordingly, this image interpolating unit 21 corresponds to the image interpolating unit of the present invention.

(Power-Saving Tag Device Control (1))

Figure 6:
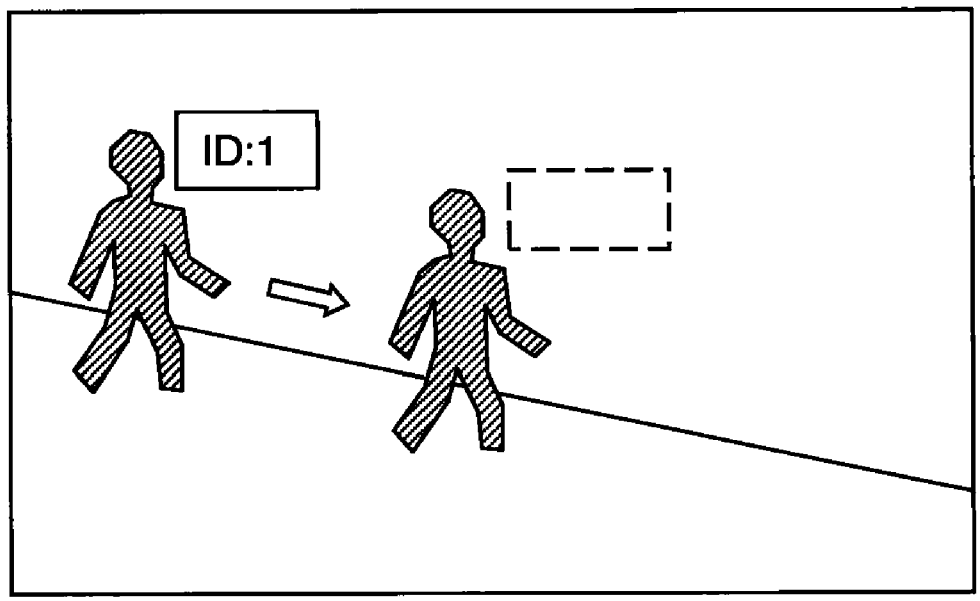
FIG. 6 is an explanatory drawing of control for disabling a tag device.

Next, the pause control of the tag device 2 will be explained as one example of the power-saving control of the tag device 2. FIG. 6 is a drawing used to explain the pause control of the tag device 2 (schematic view of the display screen of the monitor 27). As described above, once the position of the person to be monitored imaged by the position identifying unit 17 using the camera unit 10 (imaged position) and the position of the person to be monitored detected by radio communication with the tag device 2 (tag position) are linked with each other, it is possible to keep track of the position of the person to be monitored using the tag device 2.

Accordingly, as illustrated in FIG. 6, if the imaged position of the person to be monitored and the tag position are linked with each other at the left-hand side position of the screen, it is possible to suppress the power consumption of the tag device 2 by placing the tag device 2 in a pause state. Note that in FIG. 6, the discrimination ID of the tag device 2 in a pause state is shown by a quadrangular dashed outline.

This processing (pause request processing) is carried out by the pause request unit 24. Specifically, this processing is performed by transmitting a pause request signal from the pause request unit 24 through the radio communication unit 9 to the tag device 2, if a determination is made by the position identification success/failure judgment unit 22 that position identification has succeeded, thereby halting the transmission of a detection signal from the tag device 2. Here, halting the transmission of a detection signal refers to decreasing the frequency of detection signal transmission. Note that halting detection signal transmission also includes stopping detection signal transmission (setting the transmission frequency to zero).

Figure 7:
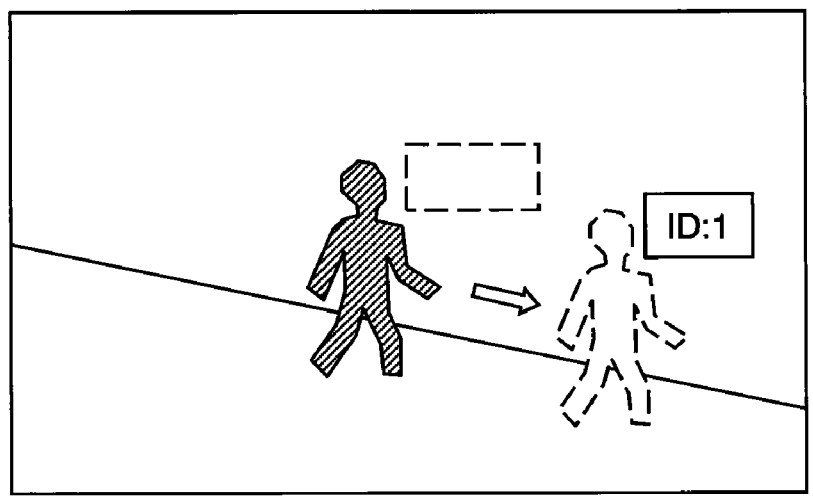
FIG. 7 is an explanatory drawing of control for enabling a tag device.

In addition, if the sight of the person to be monitored is lost at the camera unit 10 in a case where such pause control as described is performed, it is no longer possible (or it becomes difficult) to keep track of the position of the person to be monitored. Hence, if the sight of the person to be monitored is lost at the camera unit 10, as illustrated in FIG. 7, when the tag device 2 is in pause, that is, if image positioning is determined to be a failure in the image positioning success/failure judgment unit 23, a transmission request is transmitted from the transmission request unit 25 to the tag device 2 to request the tag device 2 to transmit a detection signal. Consequently, radio positioning information provided by the radio positioning unit 14 and image positioning information provided by the image positioning unit 16 of the camera unit 10 are integrated in the position identifying unit 17 on the basis of the detection signal from the tag device 2 to identify the position of the person to be monitored. Thus, it is possible to continue tracking. Such processing (first transmission request processing) as described above is carried out by the transmission request unit 26. Accordingly, this transmission request unit 26 corresponds to the first transmission request unit of the present invention.

If a determination is made by the position identification success/failure judgment unit 22 that position identification has failed when such pause control as described above is performed and therefore the frequency of detection signal transmission from the tag device 2 is kept low, then a transmission request is transmitted from the transmission request unit 25 to the tag device 2 to request the tag device 2 to transmit a detection signal without waiting for the next transmission timing (a request to increase the frequency of detection signal transmission may be transmitted instead of the transmission request). Consequently, radio positioning information provided by the radio positioning unit 14 and image positioning information provided by the image positioning unit 16 of the camera unit 10 are integrated in the position identifying unit 17 on the basis of the detection signal from the tag device 2 to identify the position of the person to be monitored. Thus, it is possible to continue tracking. Such processing (second transmission request processing) as described above is carried out by the transmission request unit 26. Accordingly, this transmission request unit 26 can be said to also correspond to the second transmission request unit of the present invention. The power-saving control (1) of the tag device explained here is intended to produce a power-saving effect particularly if the tag device 2 is an active tag. If the tag device 2 is a semi-passive tag, the tag device 2 does not perform spontaneous (or periodic) detection signal transmission. Alternatively, the tag device 2 transmits a detection signal in response to a transmission request only when the tag device 2 receives the transmission request from the sensor device 3. Therefore, the need for control to place the tag device 2 in a pause state is eliminated by making a pause request from the sensor device 3. If a determination is made by the image positioning success/failure judgment unit 23 of the sensor device 3 that image positioning has failed or if a determination is made by the position identification success/failure judgment unit 22 that position identification has failed, it is possible to attain a power-saving effect by sending a transmission request from the sensor device 3 to the tag device 2 to cause the tag device 2 to transmit a detection signal.

(Power-Saving Tag Device Control (2))

Next, as another example of power-saving control of the tag device 2, an explanation will be made of a case where the frequency of positioning the tag device 2 by the radio communication unit 9 (tag positioning) is lower than the frequency of positioning a person to be monitored by the camera unit 10 (image positioning).

Figure 8:
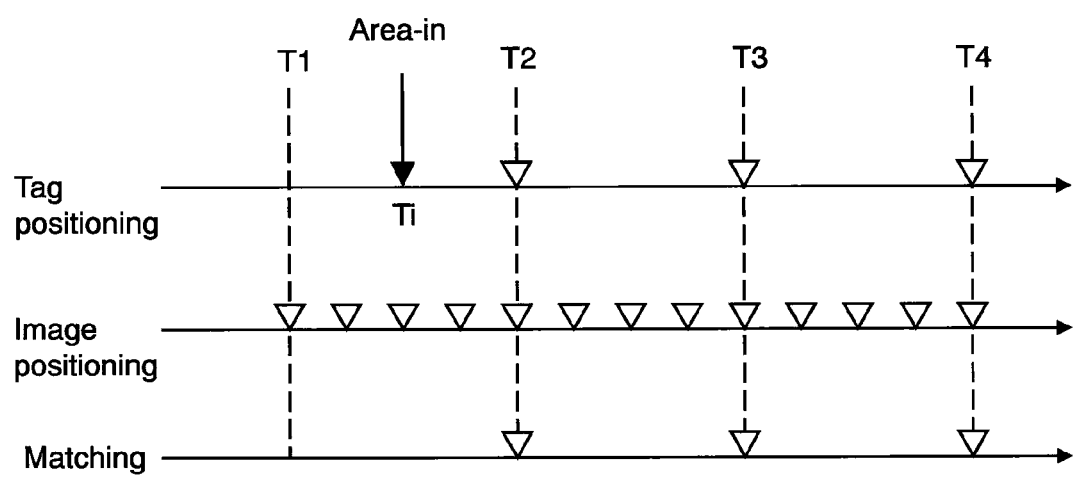
FIG. 8 is an explanatory drawing of a timing between tag positioning and image positioning.

FIG. 8 is an explanatory drawing of a timing between tag positioning and image positioning. As illustrated in FIG. 8, the frequency of tag positioning is set lower than the frequency of image positioning in this case. By decreasing the frequency of tag positioning in this way, it is possible to suppress the power consumption of the tag device 2. If the tag device 2 is an active tag, this objective is realized by setting the frequency of periodically transmitting a detection signal in the radio communication unit 6 of the tag device 2. If the tag device 2 is a semi-passive tag, this objective can be realized by making a transmission request from the sensor device 3 to the tag device 2 with a frequency lower than the frequency of image positioning.

If such settings as described above are configured, only image positioning may be performed and tag positioning may not be performed in some cases when a person to be monitored carrying the tag device 2 enters the monitoring area of the sensor device 3 (when the person goes into an "area-in" state) since tag positioning and image positioning are not in synchronization. Even in such a case, image positioning synchronizes with the timing of tag positioning at a point in time after image positioning is performed a predetermined number of times and, thus, matching therebetween is accomplished. Note that the term "matching" refers to processing for determining an image area of a human object corresponding to a tag positioning-based position and attaching tag information (discrimination ID) to that image area of the human object. Matching is processing carried out by the above-described position identifying unit 17.

In the present embodiment, it is possible to apply processing for attaching tag information (discrimination ID) to a pre-matching image area of a human object by means of estimation based on post-matching tag positioning data and image positioning data (second discrimination information interpolation processing), in cases where only image positioning is performed and tag positioning is not performed. In the example of FIG. 9, the tag information "ID: 1" is attached to the pre-matching image area of a human object (on the left-hand side of the screen) by second discrimination information interpolation processing. The second discrimination information interpolation processing is carried out by the discrimination information interpolating unit 22. Accordingly, this discrimination information interpolating unit 22 can also be said to correspond to the second discrimination information interpolating unit of the present invention.

According to such a position identifying system 1 of an embodiment of the present invention as described above, a position calculated on the basis of a picked-up image (image position) and a position detected on the basis of a detection signal of the tag device 2 (tag position) are linked with each other. Consequently, even if an image of a monitoring target cannot be taken, it is possible to identify the position of the monitoring target. Thus, it is possible to keep track of the movement of the monitoring target.

That is, in the present embodiment, a position calculated on the basis of a picked-up image (image position) and a position detected on the basis of the detection signal of the tag device 2 (tag position) are linked with each other and, thereby, the position of the monitoring target (person to be monitored) is identified. In this case, the monitoring target carries the tag device 2. Accordingly, even if the monitoring target cannot be imaged in some cases thereafter, as illustrated in FIG. 5, the position of the monitoring target is detected on the basis of the detection signal of the tag device 2 once the position of the monitoring target is identified. Thus, it is possible to keep track of the movement of the monitoring target.

In addition, in the present embodiment, if the position of the monitoring target is identified by linking (integrating) the image position and the tag position with each other, as illustrated in FIG. 6, the tag device 2 is caused to halt transmission of a detection signal. Consequently, it is possible to reduce the power consumption of the tag device 2. In this case, the position of the monitoring target is calculated on the basis of the picked-up image. Thus, it is possible to keep track of the movement of the monitoring target.

In addition, in the present embodiment, if the position of the monitoring target has not been able to be calculated on the basis of a picked-up image (if the monitoring target is lost), as illustrated in FIG. 7, the tag device 2 is caused to restart transmission of a detection signal. Consequently, if the monitoring target cannot be imaged, the position of the monitoring target is detected on the basis of the detection signal of the tag device 2. Thus, it is possible to continue to keep track of the movement of the monitoring target.

In addition, in the present embodiment, even if identifying the position of the monitoring target has failed and the discrimination information of the tag device 2 cannot be attached to an image of the monitoring target, as illustrated in FIG. 4, the discrimination information of the tag device 2 attached to the image as the result of subsequent success in identifying the position of the monitoring target is retroactively attached to the image, thereby compensating the monitoring target for the lack of the discrimination information. Thus, it is possible to continuously know the movement of the monitoring target.

In addition, in the present embodiment, even if the position of the monitoring target has not been able to be calculated on the basis of a picked-up image, as illustrated in FIG. 5, processing is performed on the basis of positions calculated before and after the failure in calculation to interpolate positions and the image areas of the monitoring target between those positions. Consequently, it is possible to continuously know the movement of the monitoring target.

In addition, in the present embodiment, it is possible to reduce the power consumption of the tag device 2 by decreasing the frequency of detection signal transmission by the tag device 2. In this case, as illustrated in FIG. 8, there may arise a difference between a timing at which a position based on a picked-up image (image position) is calculated and a timing at which a position based on the detection signal of the tag device 2 (tag position) is detected. For example, in some cases, the tag position may not be detected before the position identification of the monitoring target (linking of the image position and the tag position with each other) and only the image position may be calculated. In such cases, tag information containing the discrimination ID of the tag device 2 is attached (retroactively) to an image of the monitoring target before the position identification of the monitoring target, as illustrated in FIG. 9, on the basis of an image position and a tag position after the position identification of the monitoring target. Consequently, it is possible to continuously know the movement of the monitoring target.

While embodiments of the present invention have been described by way of example, the scope of the present invention is not limited to these embodiments. The invention may be altered or modified according to the purpose thereof within the scope of the appended claims.

(Position Identifying Systems of Other Embodiments)

Hereinafter, position identifying systems in accordance with other embodiments will be described with reference to FIGS. 10 to 18. Position identifying systems of other embodiments are characterized by operation whereby an image position and a tag position are linked (matched) with each other. Accordingly, an explanation will be made here with a focus on the configuration and operation of a position identifying unit which is a characteristic feature of the position identifying systems of other embodiments. Unless otherwise referred to herein, the configuration and operation of the position identifying systems of other embodiments are the same as those discussed in the above-described embodiments.

Figure 10:
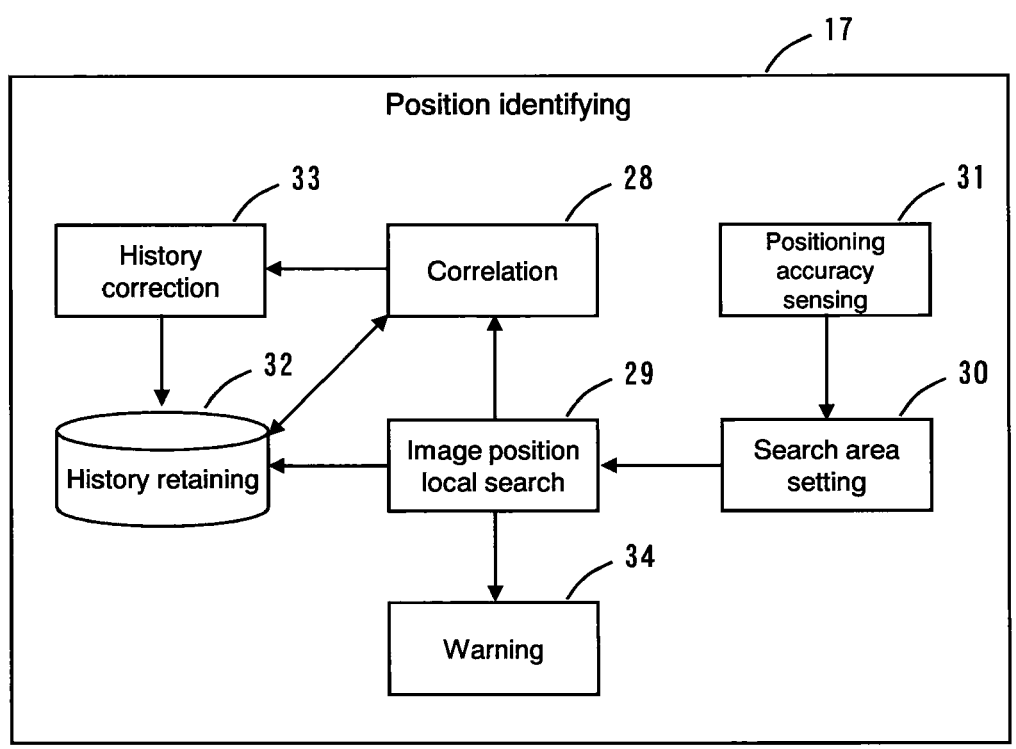
FIG. 10 is a block diagram illustrating the configuration of a position identifying unit in a position identifying system of another embodiment.

FIG. 10 is a block diagram illustrating the configuration of a position identifying unit in a position identifying system of another embodiment. As illustrated in FIG. 10, a position identifying unit 17 is provided with a correlation unit 28 for correlating the image position (results of image positioning) and the tag position (results of radio positioning) on the basis of a distance between a position calculated by the image positioning unit 14 (image position) and a position detected by the radio positioning unit 16 (tag position).

This position identifying unit 17 is provided with an image position local search unit 29 for exploring whether or not the tag position exists within a circular area having a predetermined radius (search area) centered on the image position. Image positions and tag positions at a certain time are input to the image position local search unit 29 and, as will be described later, there is performed processing for searching for a tag position which exists within the predetermined search area centered on a image position. The correlation unit 28 correlates the image position and the tag position with each other on the basis of the results of search by this image position local search unit 29 (see FIG. 11).

The position identifying unit 17 is provided with a search area setting unit 30 for setting the size and shape of this search area. In addition, the position identifying unit 17 is provided with a positioning accuracy sensing unit 31 for sensing the positioning accuracy of image positioning. The search area setting unit 30 sets the size of the search area according to the positioning accuracy of image positioning sensed by this positioning accuracy sensing unit 31. For example, the accuracy of image positioning when a person (monitoring target) is detected or identified by image processing is determined on the basis of dispersity (matching accuracy when the person is matched to a "human template") or the like (if the matching accuracy is high, then the accuracy of image positioning is also high in value). If the accuracy of image positioning is high, the size (radius) of the search area is set small and if the accuracy of image positioning is low, the size (radius) of the search area is set large. Note that here, an explanation will be made by taking a circular area having a predetermined radius as an example of the search area. However, the shape of the search area is not limited to this but may be, for example, quadrangular or hexagonal.

In addition, the positioning accuracy sensing unit 31 may have the function to sense the positioning accuracy of radio positioning. In this case, the search area setting unit 30 sets the size of the search area according to the positioning accuracy of radio positioning sensed by this positioning accuracy sensing unit 31. The accuracy of radio positioning is determined on the basis of, for example, the reception quality of the detection signal of the tag device 2 (strength of received radio field or error rate) (if the reception quality is high, then the accuracy of radio positioning is also high in value).

Figure 11:
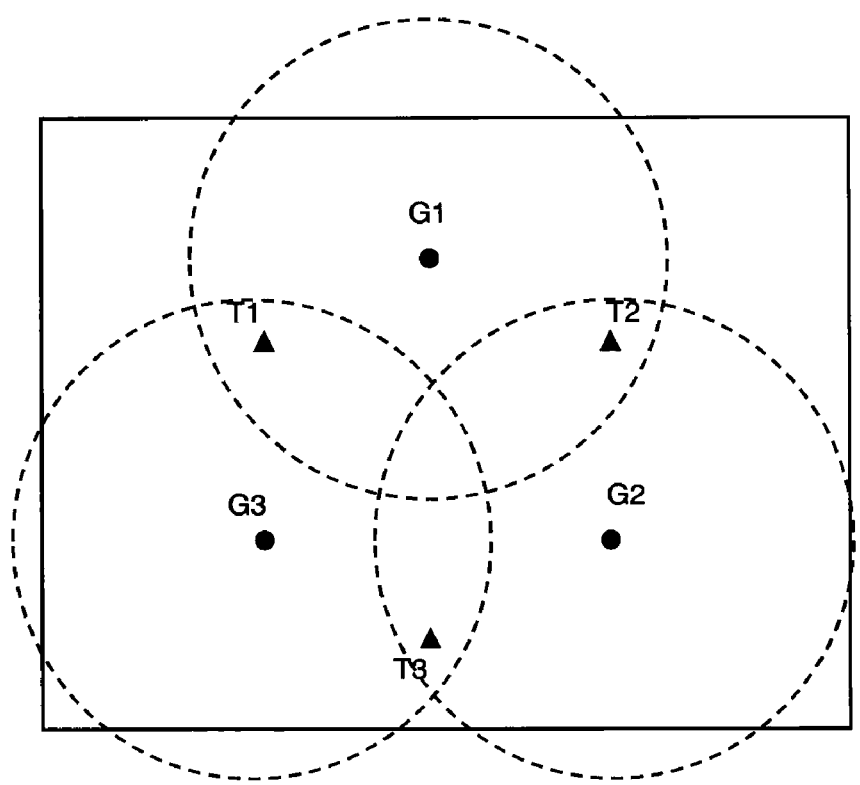
FIG. 11 is a drawing illustrating one example of processing at time t1 in a position identifying unit.

In addition, the position identifying unit 17 is provided with a history retaining unit 32 for retaining information on those plurality of positions (e.g., time, image position, tag position corresponding to the image position, and the like) as candidate information if a plurality of tag positions exists within a search area centered on an image position (see FIG. 11). The correlation unit 28 has the function to correlate the image position and the tag position with each other on the basis of the candidate information retained in this history retaining unit 32.

In addition, the position identifying unit 17 is provided with a history correction unit 33 for correcting the candidate information retained by this history retaining unit 32. For example, as will be described later, even if a plurality of image positions cannot be correlated with tag positions (cannot be determined in a one-to-one manner) at time t1, it is possible, in some cases, to correlate each image position with each tag position (can be determined in a one-to-one manner) when time t2 arrives thereafter. In such cases, the information of the history retaining unit 32 is rewritten by this history correction unit 33 (see FIG. 12).

Furthermore, this position identifying unit 17 is provided with a warning unit 34 for issuing a warning sound, a warning display, or the like if a tag position does not exist within a search area centered on an image position. Consequently, if any tag positions to be correlated with an image position do not exist within the search area, the warning unit 34 issues a warning (warning sound, warning display, or the like) as having found a monitoring target not carrying the tag device 2, in order to call a user's attention.

Now the operation of the position identifying system of another embodiment configured as described above will be explained with reference to FIGS. 11 to 14. Here, an explanation will be made specifically of processing at the position identifying unit which is a characteristic feature of this position identifying system.

FIGS. 11 and 12 are drawings illustrating one example of processing in this position identifying unit. In this example, as illustrated in FIG. 11, three image positions (G1 to G3) have been calculated at time t1 by an image positioning unit 16 and three tag positions (T1 to T3) have been detected by a radio positioning unit 14. The radius of a search area is set on the basis of the positioning accuracy of image positioning and a search is made for tag positions within a search area centered on an image position. For example, in FIG. 11, three search areas respectively centered on three image positions are shown by dashed circular lines. In this case, the two tag positions T1 and T2 exist within the search area of the image position G1 and, therefore, the image position and the tag positions cannot be correlated in a one-to-one manner.

Accordingly, in this case, candidate information showing that tag positions corresponding to the image position G1 at time t1 are T1 and T2 is recorded in the history retaining unit 32. Likewise, candidate information showing that tag positions corresponding to the image position G2 at time t1 are T2 and T3 and that tag positions corresponding to the image position G3 at time t1 are T1 and T3 is recorded in the history retaining unit 32.

When time t2 arrives thereafter, two image positions (G1 and G2) are calculated by the image positioning unit 16 and two tag positions (T1 and T2) are detected by the radio positioning unit 14, as illustrated in FIG. 12. Then, the radius of a search area is set on the basis of the positioning accuracy of image positioning in the same way as described above, and a search is made for tag positions within the search area centered on an image position. For example, in FIG. 12, two search areas respectively centered on two image positions are shown by dashed circular lines. In this case, only one tag position T1 exists within the search area of the image position G1 and, therefore, the image position G1 and the tag position T1 are correlated with each other in a one-to-one manner. Likewise, only one tag position T2 exists within the search area of the image position G2 and, therefore, the image position G2 and the tag position T2 are correlated with each other in a one-to-one manner. The history retaining unit 32 at this point in time is in a state before correction shown in FIG. 12. Next, the history correction unit 33 refines previous candidate information using correlation results obtained at time t2. Specifically, the history correction unit 33 refines the candidate information (T1 and T2) corresponding to the image position G1 at time t1, using the information that G1 obtained at time t2 corresponds to the tag position T1, so as to define that the tag position corresponding to the image position G1 is T1 also at time t1. Likewise, the history correction unit 33 refines the previous candidate information, so as to define that the tag position corresponding to the image position G2 at time t1 is T2. Furthermore, since the tag position T1, between the pieces of candidate information (T1 and T3) of the image position G3 at time t1, has already been correlated with the image position G1, the history correction unit 33 refines the previous candidate information, so as to define that the image position G3 is correlated with the tag position T3. Using the above-described results, the history correction unit 33 corrects the data of the history retaining unit 32 from the pre-correction state shown in FIG. 12 to a post-correction state.

In addition, an image position and a tag position may be correlated with each other using likelihood. Hereinafter, correlation using likelihood will be explained in detail with reference to FIGS. 13 and 14.

Figure 13:
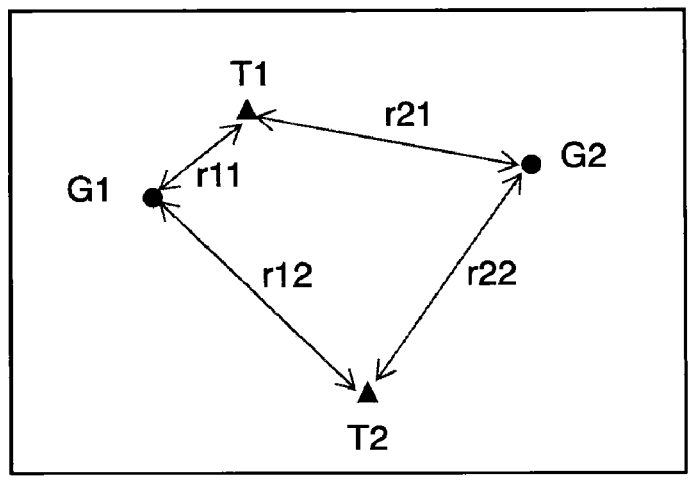
FIG. 13 is a drawing illustrating one example of creating candidate information with likelihood.

FIG. 13 is a drawing illustrating one example of creating candidate information with likelihood. Assume, for example, that at a certain time, two image positions (G1 and G2) are calculated by the image positioning unit 16 and two tag positions (T1 and T2) are detected by the radio positioning unit 14. Assuming that distances from the image position G1 to the tag positions T1 and T2 are r11 and r12 and that distances from the image position G2 to the tag positions T1 and T2 are r21 and r22, then the likelihood ratio of an image position corresponding to a tag position equals the reciprocal number of a distance therebetween. For example, if r11:r12=1:3 as in the example of FIG. 13, then the likelihood ratio of the tag position corresponding to the image position G1 equals 3:1 (=75%:25%). Therefore, in this case, the candidate information with likelihood showing that tag positions corresponding to the image position G1 are T1 (75%) and T2 (25%) at time t1 is recorded in the history retaining unit 32. Likewise, if r21:r22=1:1, then the candidate information with likelihood showing that tag positions corresponding to the image position G2 are T1 (50%) and T2 (50%) at time t1 is recorded.

FIG. 14 is a drawing illustrating one example of correlation based on a history of candidate information with likelihood. Assume that candidate information with likelihood at time t1 and t2 is recorded as illustrated in FIG. 14. In this case, it is possible to evaluate correlations at the respective times by means of Bayes estimation. In the example of FIG. 14, a conditional probability (posterior probability) $P(T_1|X_1)$ whereby the image position G1 is correlated with the tag position T1 is calculated using Bayes' theorem under the condition that data $X_1$ is observed.

Here, $T_1$ denotes an event in which the image position G1 is correlated with the tag position T1, and $T_2$ denotes an event in which the image position G1 is correlated with the tag position T2. In addition, $P(T_1)$ denotes a probability (prior probability) whereby the image position G1 is correlated with the tag position T1. Note that, for ease of explanation, a case is assumed here in which there are only two tag positions.

Since there are only two tags, the prior probability is represented as $P(T_1)=P(T_2)=0.5$. If $P(T_1)$ is updated using data and consequently increases above a predetermined upper threshold (e.g., 0.95), then a determination is made that the image position G1 can be correlated with the tag position T1. In contrast, if $P(T_1)$ decreases below a predetermined lower threshold (e.g., 0.05), then a determination is made that the image position G1 cannot be correlated with the tag position T1.

In this example, the posterior probability using data $X_1$ is calculated as $P(T_1|X_1)=0.7$, and the posterior probability using data $X_2$ is calculated as $P(T_1|X_2)=0.78$. The posterior probability using data $X_3$ is calculated as $P(T_1|X_3)=0.93$. The posterior probability using data $X_4$ is calculated as $P(T_1|X_4)=0.97$. At this time, the posterior probability increases above the upper threshold (0.95) and, therefore, the tag position T1 and the image position G1 are correlated with each other.

In such a position identifying system of another embodiment as described above, the image positioning and radio positioning results of a monitoring target can be appropriately correlated with each other on the basis of a distance between an image position and a tag position. For example, if an image position and a tag position are close to each other, then the image position and the tag position are regarded as those of the same monitoring target and can therefore be correlated with each other. In this case, if a tag position exists within a predetermined search area centered on an image position (e.g., within a predetermined radius), it is possible to regard the positions as those of one and the same monitoring target and appropriately correlate the image position and the tag position with each other. Consequently, the accuracy of identifying the position of the monitoring target is improved.

In addition, in this case, it is possible to appropriately set the size of a search area centered on an image position by the search area setting unit 30 according to the image positioning accuracy of a monitoring target. For example, if the positioning accuracy is high, then the size of the search area is set small. If the positioning accuracy is low, then the size of the search area is set large.

In addition, if a plurality of tag positions exists within a search area centered on an image position, then information on those plurality of positions (e.g., time, image position, tag position corresponding to the image position, and the like) is retained in the history retaining unit 32 as candidate information. The correlation unit 28 can appropriately correlate the image positioning and radio positioning results of the monitoring target with each other on the basis of the candidate information retained in this history retaining unit 32.

Furthermore, in such a case where any tag positions do not exist within a search area centered on an image position (e.g., within a predetermined radius), a warning (warning sound, warning display, or the like) can be issued by the warning unit 34 to call a user's attention.

Note that the correlation unit 28 may take the place of the image position local search unit 29 to correlate the image position and the tag position with each other on the basis of the results of search by a tag position local search unit 35 which will be described later in modified example 1. When the tag position local search unit 35 makes a search, the size of a search area may be set according to the accuracy of radio positioning. If there is a plurality of image positions within the search area, these image positions may be retained in the history retaining unit 32 as candidate information. Furthermore, the correlation unit 28 may correlate the image positioning and radio positioning results of the monitoring target with each other on the basis of the candidate information obtained by the tag position local search unit 35 and retained in the history retaining unit 32. In that case, if any image position exists within a predetermined search area (e.g., within a predetermined radius) centered on the tag position, it is possible to regard the image positioning and radio positioning results of the monitoring target as those of one and the same monitoring target and appropriately correlate the results with each other.

(Modified Example 1 of Position Identifying System of Another Embodiment)

Figure 15:
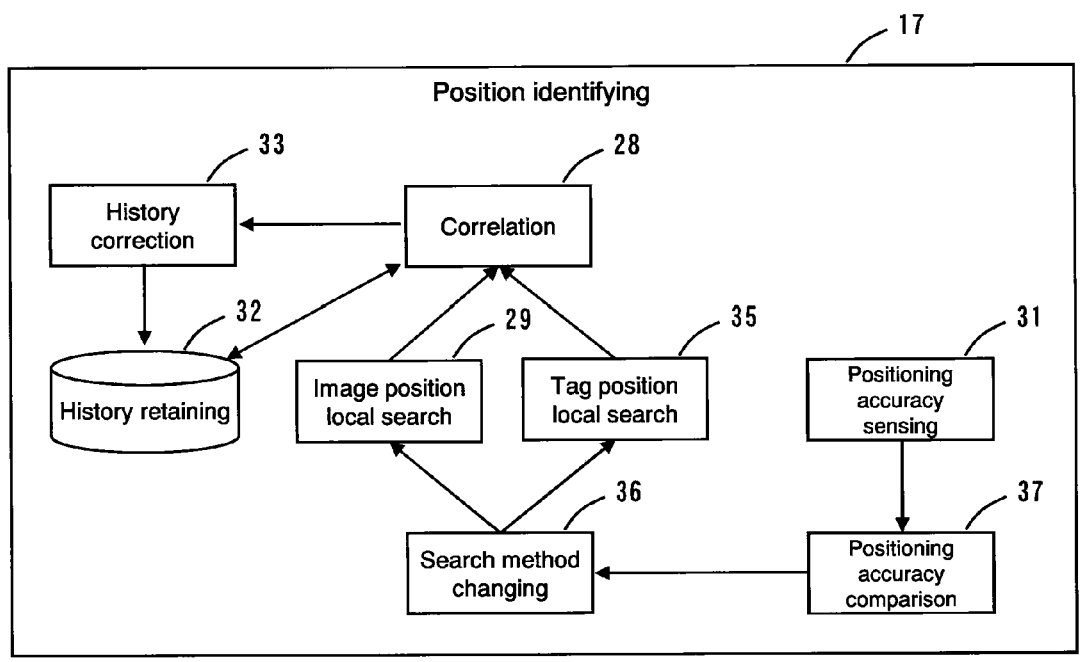
FIG. 15 is a block diagram illustrating the configuration of modified example 1 of a position identifying system of another embodiment.

FIG. 15 a block diagram illustrating the configuration of modified example 1 of a position identifying system of another embodiment. Also here, an explanation will be made with a focus on the configuration and operation in which modified example 1 differs from other embodiments. That is, unless otherwise referred to here, the configuration and operation of modified example 1 are the same as those of the above-described other embodiments.

A position identifying unit 17 of modified example 1 is provided with not only an image position local search unit 29 but also a tag position local search unit 35 for exploring whether or not any tag positions exist within a circular area (search area) having a predetermined radius and centered on a tag position. Tag positions and image positions at a certain time are input to the tag position local search unit 35, and processing is performed in order to search for an image position which exists within a predetermined search area centered on a tag position. This position identifying unit 17 is provided with a search method changing unit 36 for changing a search method (whether to use the image position local search unit 29 or the tag position local search unit 35) according to the positioning accuracies of image positioning and radio positioning.

In this case, the positioning accuracy sensing unit 31 of the position identifying unit 17 has the function to sense the positioning accuracies of both the image positioning unit 16 and the radio positioning unit 14. For example, the accuracy of image positioning when a person (monitoring target) is detected or identified by image processing is determined on the basis of dispersity (matching accuracy when the person is matched to a "human template") or the like (if the matching accuracy is high, then the accuracy of image positioning is also high in value). In addition, the accuracy of radio positioning is determined on the basis of, for example, the reception quality of the detection signal of the tag device 2 (strength of received radio field or error rate) (if the reception quality is high, then the accuracy of radio positioning is also high in value). In addition, the position identifying unit 17 is provided with a positioning accuracy comparison unit 37 for comparing the positioning accuracy of image positioning with the positioning accuracy of radio positioning.

The search method changing unit 36 changes the search method on the basis of the results of positioning accuracy comparison. Specifically, if the positioning accuracy of image positioning is higher, the search method changing unit 36 uses the image position local search unit 29 to explore whether or not any tag positions exist within a search area centered on an image position. If the positioning accuracy of tag positioning is higher, the search method changing unit 36 uses the tag position local search unit 35 to explore whether or not any image positions exist within a search area centered on a tag position.

According to such a position identifying system of modified example 1 as described above, the positioning accuracy of image positioning and the accuracy radio positioning are compared with each other. If a position evaluated at lower positioning accuracy exists within a predetermined search area (e.g., within a predetermined radius) centered on a position evaluated at higher positioning accuracy, then it is possible to regard the image positioning and radio positioning results of the monitoring target as those of one and the same monitoring target and appropriately correlate the results.

Specifically, if the positioning accuracy of image positioning is higher and when a tag position exists within a search area centered on an image position, it is possible to regard the image position and the tag position as those of one and the same monitoring target and appropriately correlate the positions. In addition, if the positioning accuracy of radio positioning is higher and when an image position exits within a search area centered on a tag position, it is possible to regard the image position and the tag position as those of one and the same monitoring target and appropriately correlate the positions.

(Modified Example 2 of Position Identifying System of Another Embodiment)

Figure 16:
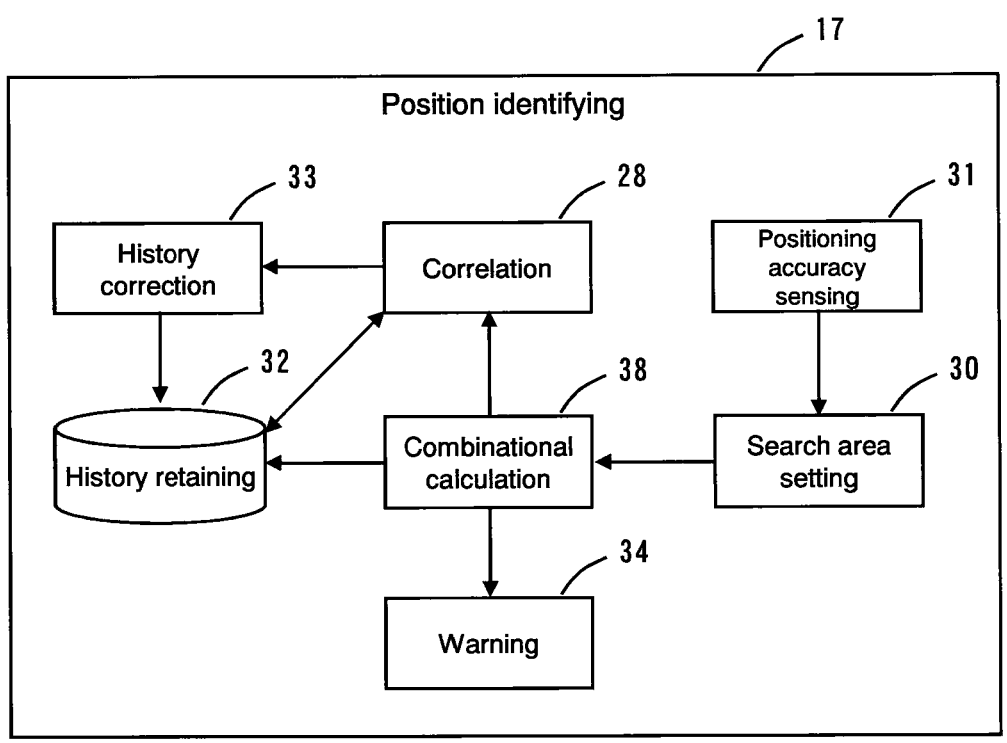
FIG. 16 is a block diagram illustrating the configuration of modified example 2 of a position identifying system of another embodiment.

FIG. 16 a block diagram illustrating the configuration of modified example 2 of a position identifying system of another embodiment. Also here, an explanation will be made with a focus on the configuration and operation in which modified example 2 differs from other embodiments. That is, unless otherwise referred to here, the configuration and operation of modified example 2 are the same as those of the above-described other embodiments.

A position identifying unit 17 of modified example 2 is provided with a combinational calculation unit 38 for calculating a combination in which a square sum of differences in distance between an image position and a tag position is minimum, in place of the image position local search unit 29. Tag positions and image positions at a certain time are input to this combinational calculation unit 38 to calculate the optimum combination of those tag positions and image positions. As a calculation method for calculating a combination in which the square sum of differences in distance between the image positions and the tag positions is minimum, a full search method or a local search method, for example, is used.

According to such a position identifying system of modified example 2 as described above, a combination in which a square sum of differences in distance between an image position and a tag position is minimum is calculated. The image position and the tag position are correlated with each other on the basis of calculation results thus obtained. Consequently, it is possible to appropriately correlate the image position and the tag position with each other.

(Modified Example 3 of Position Identifying System of Another Embodiment)

Figure 17:
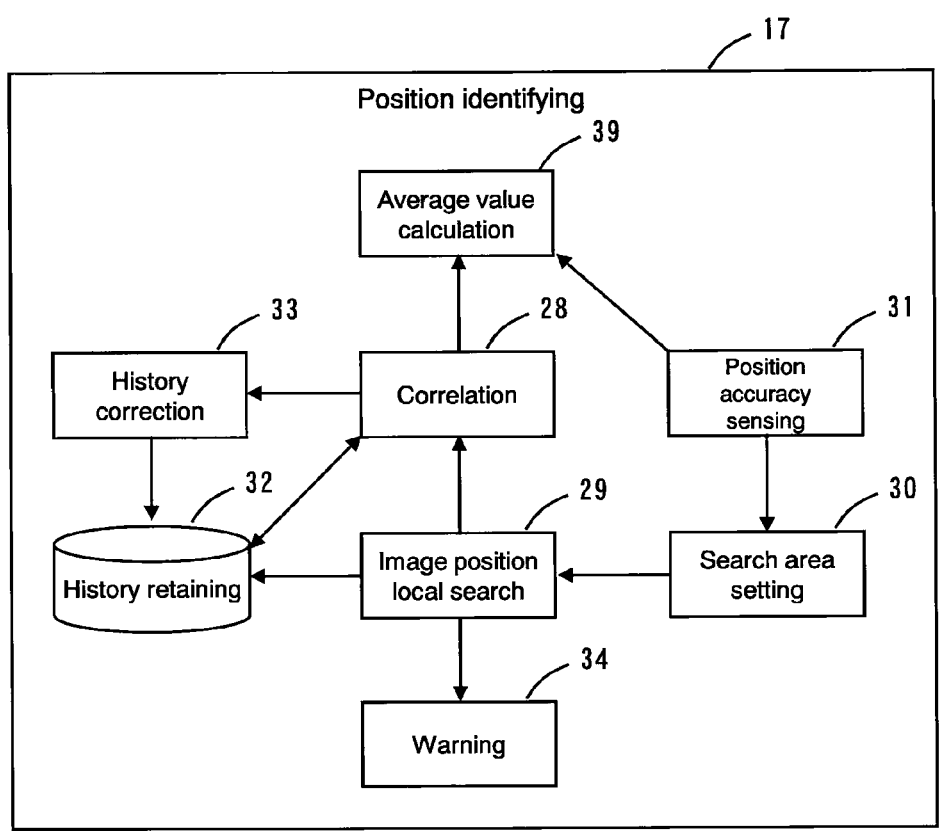
FIG. 17 is a block diagram illustrating the configuration of modified example 3 of a position identifying system of another embodiment.

FIG. 17 a block diagram illustrating the configuration of modified example 3 of a position identifying system of another embodiment. Also here, an explanation will be made with a focus on the configuration and operation in which modified example 3 differs from other embodiments. That is, unless otherwise referred to here, the configuration and operation of modified example 3 are the same as those of the above-described other embodiments.

A position identifying unit 17 of modified example 3 is provided with an average value calculation unit 39 for calculating an average position of correlated image positions and tag positions as the position of a monitoring target. The positioning accuracies of image positioning and radio positioning are input to this average value calculation unit 39. Then, using Expression 3 shown below, a weighted average according to the positioning accuracies is calculated as an average position of the monitoring target.

[Expression 3]

$$x = \frac{a_v}{a_v + a_t} x_v + \frac{a_t}{a_v + a_t} x_t \quad \text{(Expression 3)}$$

Here, "x" is the average position of a monitoring target (integrated position coordinate), "$x_v$" is an image position (camera position coordinate), and "$x_t$" is a tag position (tag position coordinate). In addition, "$a_v$" is the positioning accuracy of image positioning (camera accuracy) and "$a_t$" is the positioning accuracy of radio positioning (tag accuracy).

According to such a position identifying system of modified example 3 as described above, an average position of image positions and tag positions is determined as the position of a monitoring target. Consequently, it is possible to appropriately identify the position of the monitoring target. Specifically, it is possible to appropriately identify the position of the monitoring target using a weighted average according to the accuracies of image positioning and radio positioning.

(Modified Example of Image Position Local Search Unit)

Figure 18:
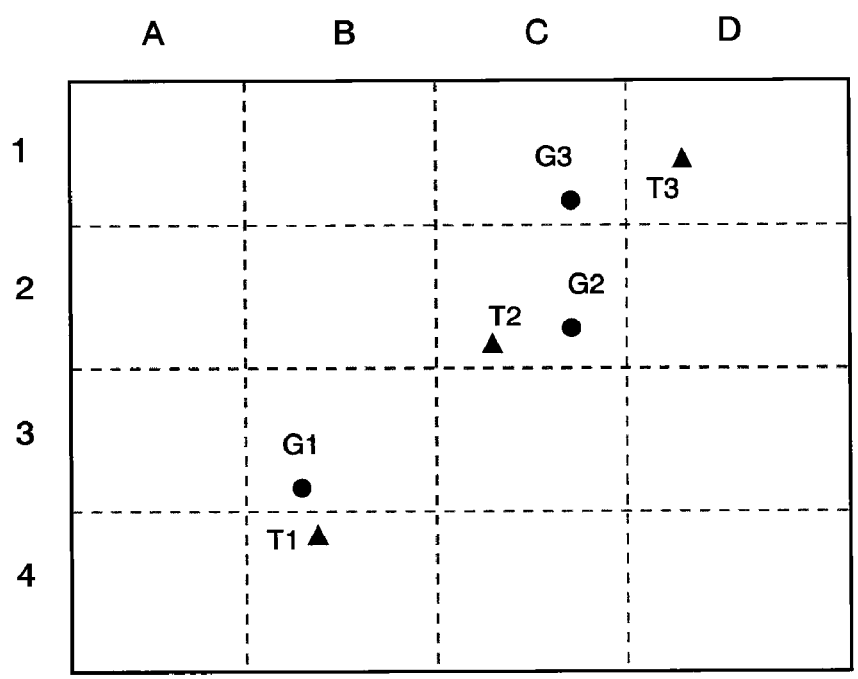
FIG. 18 is a drawing used to explain a modified example of an image position local search unit.

FIG. 18 is a drawing used to explain a modified example of an image position local search unit. In this modified example, as illustrated in FIG. 18, image positions and tag positions are located within a cellular space divided into a plurality of cells (in FIG. 18, 16 cells from A1 to D4 are shown by way of example).

In the example of FIG. 18, three image positions G1 to G3 and three tag positions T1 to T3 are respectively located within the cellular space. Specifically, the image position G1 is located in the cell B3 and the tag position T1 is located in the cell B4. The image position G2 and the tag position T2 are located in the cell C2. The image position G3 is located in the cell C3 and the tag position T3 is located in the cell D4.

In this image position local search unit 29, an image position and a tag position are correlated with each other on the basis of a positional relationship between a cell to which the image position belongs and a cell to which the tag position belongs.

First, when corresponding tag positions are searched for with respect to the image position G1, a search is made to determine whether or not any tag positions belong to the same cell (cell B3) as the cell B3 to which the image position G1 belongs. In this case, no tag positions exist in the cell B3. In such a case, the range of search for tag positions is widened. For example, the range of search is widened to include cells (cells A2, B2, C2, A3, C3, A4, B4 and C4) around the cell B3 to which the image position G1 belongs, in order to explore whether or not any tag positions belong to those cells. In this case, the tag position T1 belonging to the cell B4 and the tag position T2 belonging to the cell C2 exist within the range. If a plurality of tag positions is found within the range of search as described above, the tag position T1 closer to the image position G1 is determined as a tag position corresponding to the image position G1 (the image position G1 and the tag position T1 are correlated with each other).

Next, when corresponding tag positions are searched for with respect to the image position G2, it is found that the tag position T2 belongs to the same cell (cell C2) as the cell C2 to which the image position G2 belongs. Accordingly, in this case, the tag position T2 is determined as a tag position corresponding to the image position G2 (the image position G2 and the tag position T2 are correlated with each other).

In addition, when corresponding tag positions are searched for with respect to the image position G3, a search is made to determine whether or not any tag positions belong to the same cell (cell C1) as the cell C1 to which the image position G3 belongs. In this case, no tag positions exist in the cell C1. Accordingly, the range of search for tag positions is widened in the same way as in the case of the image position G1. For example, the range of search is widened to include cells (cells B1, D1, B2, C2 and D2) around the cell C1 to which the image position G3 belongs, in order to explore whether or not any tag positions belong to those cells. In this case, the tag position T3 belonging to the cell D1 and the tag position T2 belonging to the cell C2 exist within the range. Accordingly, if a plurality of tag positions is found within the range of search as in the case of the image position G1, the tag position T3 closer to the image position G3 is determined as a tag position corresponding to the image position G3 (the image position G3 and the tag position T3 are correlated with each other). Note that in this case, the tag position T2 has already been correlated with the image position G2. Therefore, the tag position T3 may be determined as a tag position corresponding to the image position G3 on the basis of that information (without making any distance calculations).

According to such a modified example of the image position local search unit 29 as described above, it is possible to appropriately correlate an image position and a tag position with each other on the basis of a positional relationship between a cell to which the image position belongs and a cell to which the tag position belongs. For example, if an image position and a tag position belong to the same cell, the image position and the tag position are regarded as those of the same monitoring target and are correlated with each other accordingly (without calculating a distance between the image position and the tag position). Consequently, it is possible to significantly reduce the amount of calculation and markedly increase processing speed, compared with a case where distance calculations are made for all image positions and tag positions.

Note that while an explanation will has been made here of the modified example of the image position local search unit 29, this modified example can also be applied to the tag position local search unit 35.

(Object Position Estimating Device)

Hereinafter, embodiments of the present invention will be described in detail with reference to the accompanying drawings.

[Overall Configuration]

Figure 19:
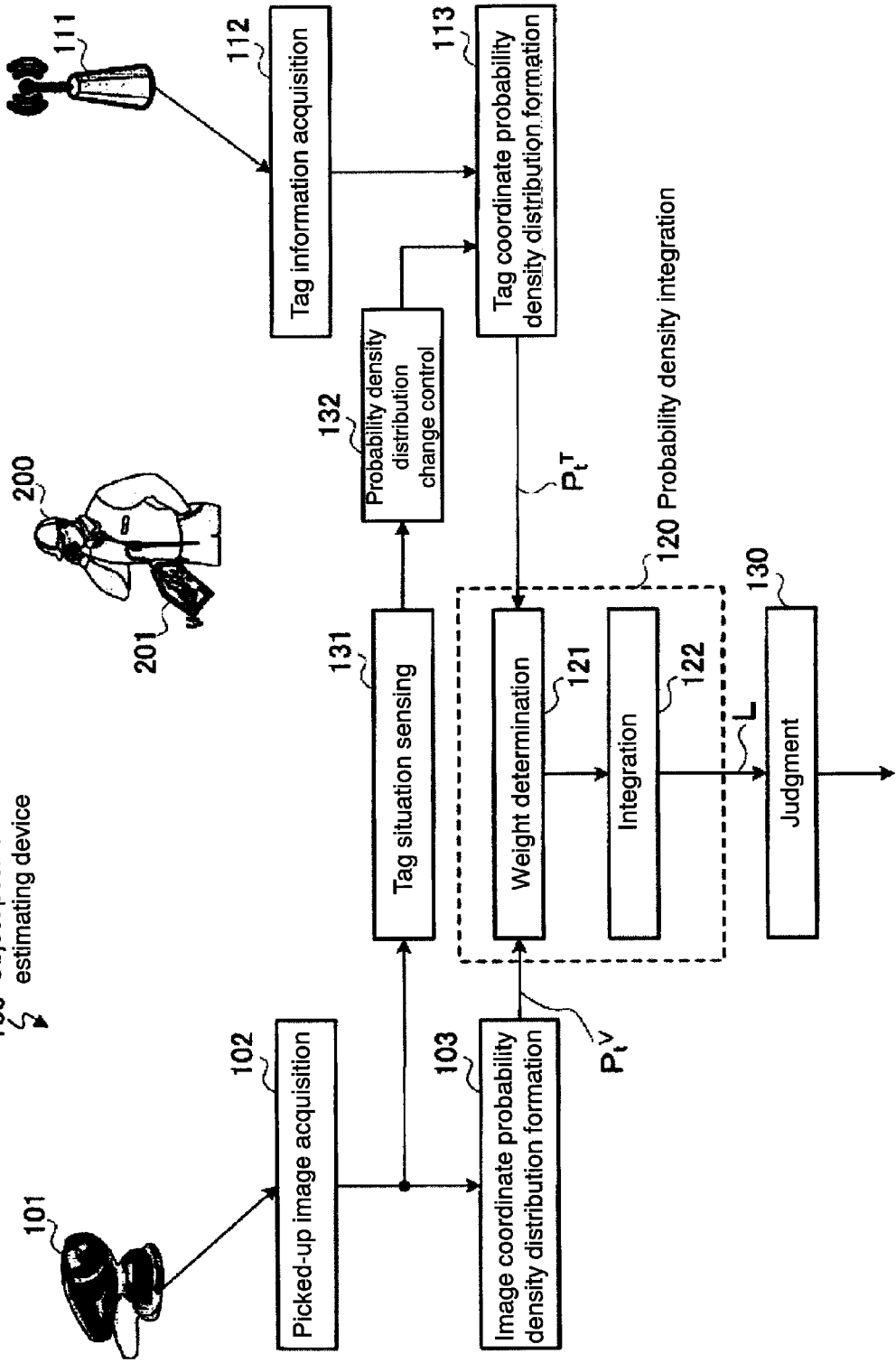
FIG. 19 is a block diagram illustrating the configuration of an object position estimating device in accordance with an embodiment of the present invention.

FIG. 19 illustrates the configuration of an object position estimating device in accordance with an embodiment of the present invention.

An object position estimating device 100 inputs a signal of a picked-up image taken by a camera 101 to a picked-up image acquisition unit 102. The picked-up image acquisition unit 102 sends out the acquired picked-up image to an image coordinate probability density distribution formation unit 103.

From a picked-up image at time "t", the image coordinate probability density distribution formation unit 103 forms a probability density distribution $P_t^V$ of the coordinates of a target (a person in the case of the FIG. 200 for which a position is estimated. In practice, the image coordinate probability density distribution formation unit 103 has preset probability density distribution models. The image coordinate probability density distribution formation unit 103 first detects locations where the target within the image is likely to exist and evaluates an existing probability at each location on the basis of the picked-up image. This existing probability may be evaluated from the degree of matching between a template for the target 200 and the target 200 detected from the picked-up image. Next, the image coordinate probability density distribution formation unit 103 creates a probability density distribution having an area according to the above-described degree of matching at each detected location using preset probability density distribution models. By summing up those distributions, the image coordinate probability density distribution formation unit 103 forms the probability density distribution $P_t^V$.

Now, specific processing performed by the image coordinate probability density distribution formation unit 103 will be explained using FIGS. 20 and 21. FIG. 20 illustrates an example in which three candidates for the target 200 are detected from a picked-up image. Assume that, as illustrated in FIG. 20(A), the degrees of matching to templates for the respective detected candidates are 5%, 75% and 20%. Then, as illustrated in FIG. 20(B), the image coordinate probability density distribution formation unit 103 creates probability density distributions having an area ratio of 5:75:20 at detected positions using probability density distribution models, and outputs these distributions as the probability density distribution $P_t^V$. Specifically, since the probability density distribution models are normal distributions, the average value thereof may be adjusted to the detected positions and the normal distributions may be subjected to scaling according to the degrees of matching. FIG. 21(A) illustrates an example in which one candidate for the target 200 is detected from a picked-up image. In this case, the image coordinate probability density distribution formation unit 103 creates such a probability density distribution as shown in FIG. 21(B) using the probability density distribution models, and outputs this distribution as the probability density distribution $P_t^V$.

Figure 22:
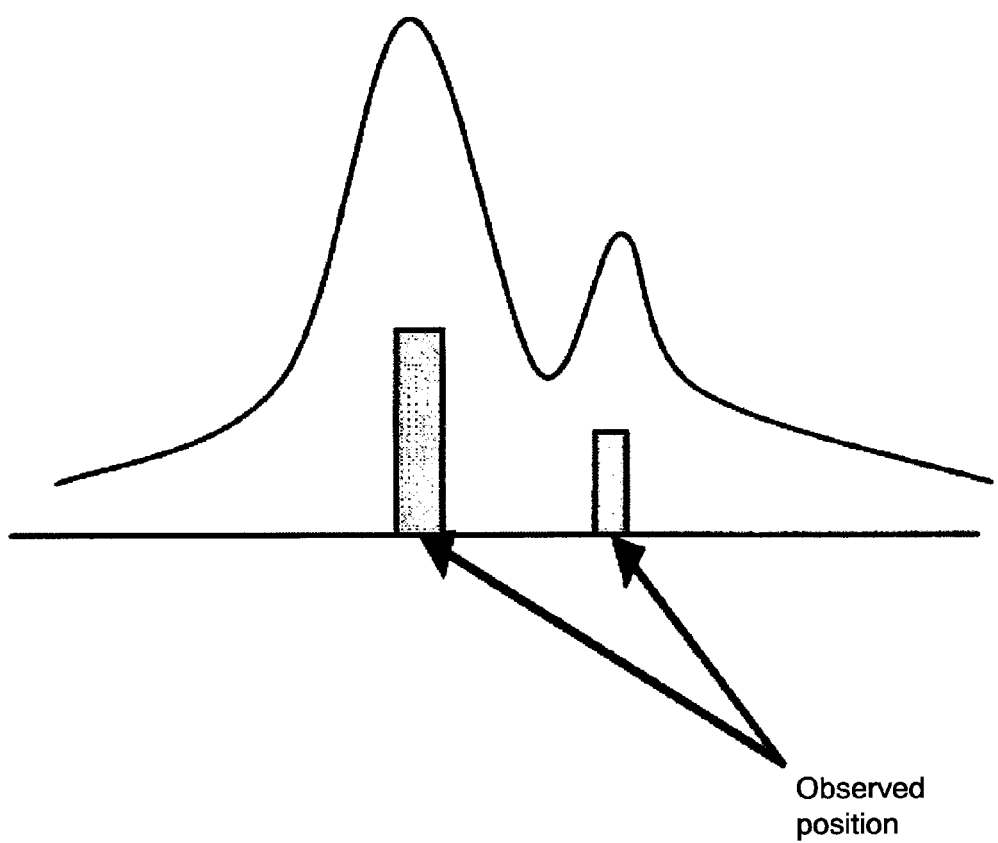
FIG. 22 is a drawing illustrating a probability density distribution when two candidate positions (observed positions) of targets, different in existing probability, are detected in a picked-up image.

Likewise, if the image coordinate probability density distribution formation unit 103 detects two candidate positions for the target 200, similar in existing probability to each other, in the picked-up image, the unit outputs such a probability density distribution as illustrated in FIG. 30(B). On the other hand, if the image coordinate probability density distribution formation unit 103 detects two candidate positions for the target 200, different in existing probability from each other, in the picked-up image, the unit outputs such a probability density distribution as illustrated in FIG. 22.

The probability density distribution $P_t^V$ formed by the image coordinate probability density distribution formation unit 103 is sent out to a weight determination unit 121 of a probability density integration unit 120.

On the other hand, the object position estimating device 100 inputs a signal received by a tag signal receiver 111 to a tag information acquisition unit 112. The tag information acquisition unit 112 extracts a signal showing tag coordinates out of acquired tag information and sends out this signal to a tag coordinate probability density distribution formation unit 113.

The tag coordinate probability density distribution formation unit 113 forms a probability density distribution $P_t^T$ of the coordinates of a tag 201 from tag coordinates at time "t". Basically, the tag coordinate probability density distribution formation unit 113 has preset probability density distribution models in the same way as the image coordinate probability density distribution formation unit 103. The probability density distribution models are normal distributions. The tag coordinate probability density distribution formation unit 113 creates a probability density distribution by adjusting the average value of a normal distribution to the tag coordinates, and outputs this distribution as the probability density distribution $P_t^T$. Note however that, in addition to this basic processing, the tag coordinate probability density distribution formation unit 113 of the present embodiment performs processing for changing the probability density distribution. Details on the processing will be described later. The probability density distribution $P_t^T$ formed by the tag coordinate probability density estimating unit 113 is sent out to the weight determination unit 121 of the probability density integration unit 120.

The integration unit 122 of the probability density integration unit 120 evaluates a probability density distribution "L", in which the probability density distribution $P_t^V$ and the probability density distribution $P_t^T$ are integrated, by the expression shown below, using the probability density distribution $P_t^V$ of the position of a target 201 at time "t" output from the image coordinate probability density distribution formation unit 103, the probability density distribution $P_t^T$ of the position of the tag 201 at time "t" output from the tag coordinate probability density distribution formation unit 113, and a weighting factor k(t) determined by the weight determination unit 121.

[Expression 4]

$$L = k(t)P_t^V + (1-k(t))P_t^T \qquad \text{(Expression 4)}$$

Here, the weight determination unit 121 performs weighting on the probability density distributions $P_t^V$ and $P_t^T$ by setting the weighting factor k(t) to a value represented by the following expression, while adding weight with an increase in the maximum probability density value of a probability density distribution.

[Expression 5]

$$k(t) = \frac{\max(P_t^V(\phi))}{\max(P_t^V(\phi)) + \max(P_t^T(\phi))} \qquad \text{(Expression 5)}$$

Note that methods for integrating probability density distributions and determining weights are not important characteristic features of the present invention, and Expressions 4 and 5 are only examples of methods for integrating probability density distributions and determining weights. The present invention can also be carried out and the advantageous effects thereof are not affected even if various heretofore proposed methods other than those represented by Expressions 4 and 5 are applied as methods for integrating probability density distributions and determining weights. For example, a fixed value may be used as the weighting factor k(t). In addition, the probability density distribution $P_t^V$ and the probability density distribution $P_t^T$ may simply be integrated with each other (the sum or the product of the densities may be calculated) without performing weighting.

The probability density distribution obtained by the integration unit 122 is input to the judgment unit 130. The judgment unit 130 determines that a position at which a probability density is maximum in the probability density distribution is the position of the target 200, and outputs this position as the results of position estimation.

In addition to such constituent elements as described above, the object position estimating device 100 includes a tag situation sensing unit 131 and a probability density distribution change control unit 132.

The tag situation sensing unit 131 is provided with an input of a picked-up image output from the picked-up image acquisition unit 102. The tag situation sensing unit 131 senses the local circumstances of the target 200 using the picked-up image. Here, the local circumstances of the target 200 can be rephrased as those of the wireless tag 201. Local circumstances refer to conditions as to whether or not there are any obstacles around the target 200 and in which position the obstacle exists, if there is any. An obstacle refers to a structure or a thing which makes the target 200 impossible or difficult to move. In addition, an obstacle refers to a thing which exists within the radio transmission range of the wireless tag 201 and within the sensing range of the tag signal receiver 111 and degrades communication between the wireless tag 201 and the tag signal receiver 111. Here, an object which exists between the wireless tag 201 and the tag signal receiver 111 is highly likely to degrade communication between the wireless tag 201 and the signal receiver 111. It is therefore effective to sense any objects which exist between the wireless tag 201 and the tag signal receiver 111 as obstacles. The results of sensing obtained by the tag situation sensing unit 131 are sent out to the probability density distribution change control unit 132.

The probability density distribution change control unit 132 performs control to cause probability density distributions in the tag coordinate probability density distribution formation unit 113 to be changed according to local circumstances sensed by the tag situation sensing unit 131. Specifically, according to the results of obstacle sensing, the probability density distribution change control unit 132 performs control to cause a change in a variance value of a normal distribution, in an average value of the normal distribution, or in probability densities according to the sensing results in some regions within the normal distribution.

For example, the probability density distribution change control unit 132 instructs the tag coordinate probability density distribution formation unit 113 to set the probability density of a position where the obstacle has been sensed to 0 and the integral value of the probability densities of other positions to 1, if any structures, things or the like which make the target 200 impossible or difficult to move are sensed by the tag situation sensing unit 131. Consequently, it is in practice possible to set the probability densities of positions, where the target 200 is unlikely to exist, to 0. It is therefore possible to make the probability density distribution $P_t^T$ even closer to a real one.

In addition, if any obstacles which may degrade communication between the wireless tag 201 and the tag signal receiver 111 are sensed in the vicinity of the wireless tag 201 and the tag signal receiver 111 by the tag situation sensing unit 131, the probability density distribution change control unit 132 instructs the tag coordinate probability density distribution formation unit 113 to form a probability density distribution $P_t^T$ in which the variance value of a normal distribution is made larger, compared with a case where the obstacles are not sensed. Consequently, it is possible to form a probability density distribution $P_t^T$ consistent with the quality of radio communication. Furthermore, in addition to the presence/absence of an obstacle, the type of obstacle may be sensed from a picked-up image and the value of variance may be changed according to the type of obstacle. For example, if an obstacle, such as metal, liable to cause radio disturbance is sensed, the variance value may be made larger, compared with a case where any obstacles unlikely to cause radio disturbance are sensed.

In addition, the probability density distribution change control unit 132 may instruct the tag coordinate probability density distribution formation unit 113 to form a probability density distribution $P_t^T$ in which the average value of the normal distribution is changed depending on whether any obstacles are sensed or not sensed. An evaluation as to what degree the average value of the normal distribution should be changed to if any obstacles are sensed, compared with a case where any obstacles are not sensed, may be previously made by means of experiment or the like. For example, if a wall or the like exists in the vicinity of the target 200 (wireless tag 201), observation results received from the wireless tag 201 deviate from those of a true position due to the effects of the wall. In that case, a relationship between the position of the wall with respect to the wireless tag 201 and the deviation may be previously evaluated by means of experiment. Then, if the wall is sensed in the vicinity, the average value of the normal distribution may be shifted by as much as the previously evaluated deviation.

Note that these changes (corrections) may be made separately to respective locations in observed data having the possibility of presence of the target. Then, an ultimate probability density distribution $P_t^T$ may be evaluated by summing up probability density distributions at respective post-change (correction) locations, according to the existing probabilities of the respective locations.

[Sensing of Local Circumstances and Change in Probability Density Distribution]

Next, the sensing of local circumstances and processing for changing a probability density distribution according to sensing results will be explained by citing specific examples.

Figure 23:
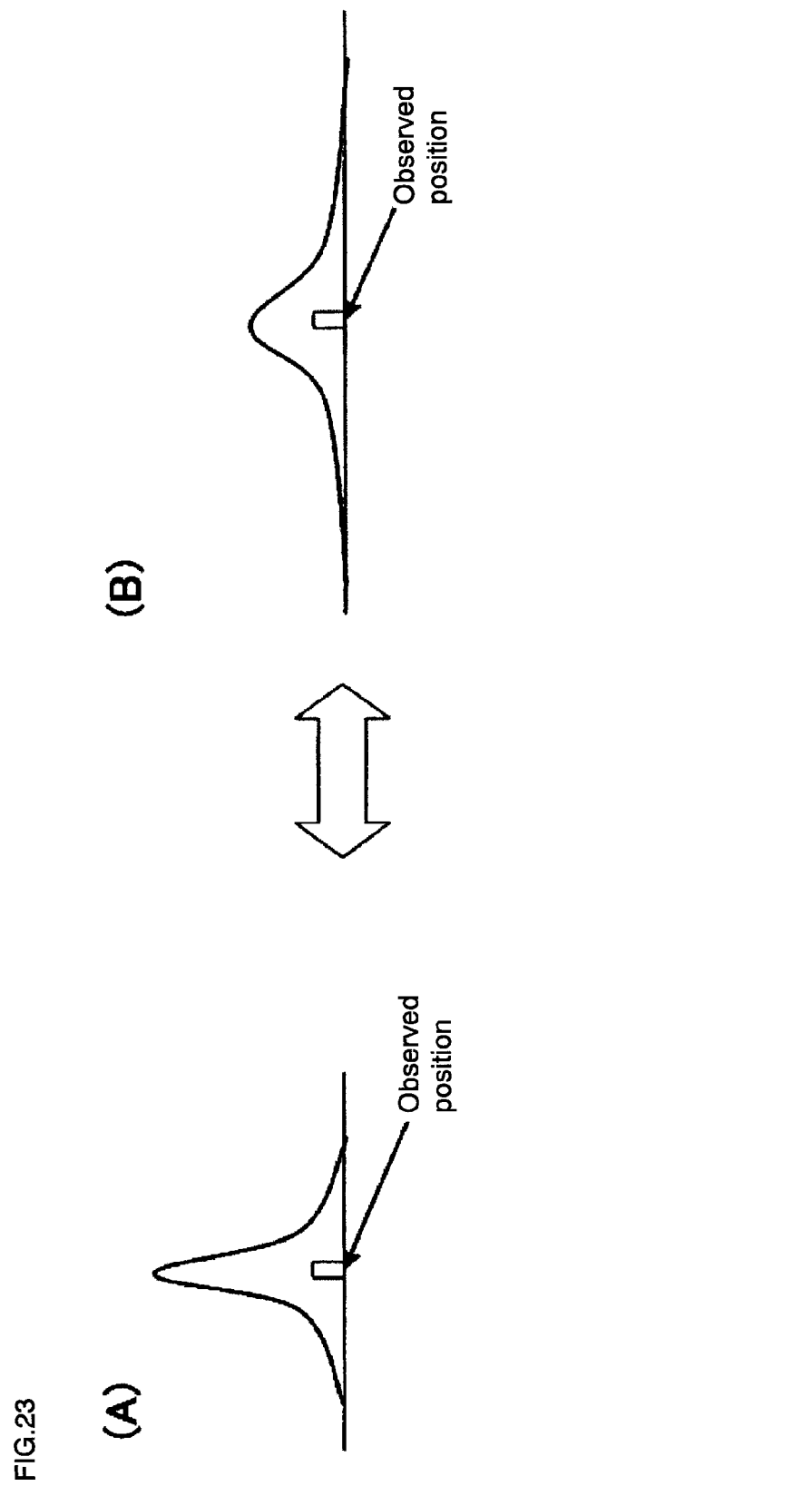

FIG. 23 illustrates an example in which the variance value of a probability density distribution is changed depending on whether or not any obstacles exist in the vicinity of the wireless tag 201 and the tag signal receiver 111. If any obstacles are not sensed in the vicinity of the wireless tag 201 and the tag signal receiver 111 by the tag situation sensing unit 131, then the tag coordinate probability density distribution formation unit 113 forms a probability density distribution having a small variance value, as illustrated in FIG. 23(A), and outputs the distribution. In contrast, if any obstacles are sensed in the vicinity of the wireless tag 201 and the tag signal receiver 111 by the tag situation sensing unit 131, then the tag coordinate probability density distribution formation unit 113 forms a probability density distribution having a small variance value, as illustrated in FIG. 23(B), and outputs the distribution. Here, both the probability density distributions of FIGS. 23(A) and 23(B) are normal distributions.

Note that for the wireless tag 201, the target 200 also serves as an obstacle. Accordingly, it is also effective that a condition in which the wireless tag 201 is carried by the target 200 is sensed by the tag situation sensing unit 131. Specifically, it is also effective that the tag situation sensing unit 131 senses such states of carrying the wireless tag 201 as illustrated in FIG. 24, and the tag coordinate probability density distribution formation unit 113 outputs a probability density distribution $P_t^T$ according to the sensing results. That is, if the tag situation sensing unit 131 senses that, as illustrated in FIG. 24(A), the wireless tag 201 is placed on the head of the target 200, the tag situation sensing unit 131 causes a probability density distribution having such a small variance as illustrated in FIG. 23(A) to be output from the tag coordinate probability density distribution formation unit 113 on the premise that any obstacle (i.e., a person) does not exists between the wireless tag 201 and the tag signal receiver 111. In contrast, if the tag situation sensing unit 131 senses that, as illustrated in FIG. 24(B), the wireless tag 201 is carried while being hanged from the neck of the target 200, the tag situation sensing unit 131 causes a probability density distribution having such a large variance as illustrated in FIG. 23(B) to be output from the tag coordinate probability density distribution formation unit 113 on the premise that an obstacle (i.e., a person) exists between the wireless tag 201 and the tag signal receiver 111.

Hereinafter, an explanation will be made of an example in which if a structure or a thing which makes the target 200 impossible or difficult to move is sensed by the tag situation sensing unit 131, a probability density distribution $P_t^T$, in which the probability density of a position where the obstacle has been sensed is 0, is output by the tag coordinate probability density distribution formation unit 113.

FIG. 25(A) is an image drawing illustrating a picked-up image taken by a camera 101. In addition, FIG. 25(B) illustrates the result of transforming a picked-up image into a plane map coordinate system. The tag situation sensing unit 131 transforms the coordinate system of the picked-up image illustrated in FIG. 25(A) to obtain such sensing results as illustrated in FIG. 25(B). Assume that the position of tag-based positioning is (17,15). Then, the probability density distribution change control unit 132 outputs the information that, from the results of tag positioning, the position of the target 200 is (17,15), and a probability density distribution change signal instructing, from the results of image-based sensing, to set probability densities satisfying "x≧20" in a probability density distribution corresponding to the obstacle to 0, to the tag coordinate probability density distribution formation unit 113. In response, the tag coordinate probability density distribution formation unit 113 outputs a probability density distribution in which the coordinates (17,15) are set as the average value of a normal distribution and the probability densities satisfying "x≧20" are set to 0, as illustrated in FIG. 26.

Figure 26:
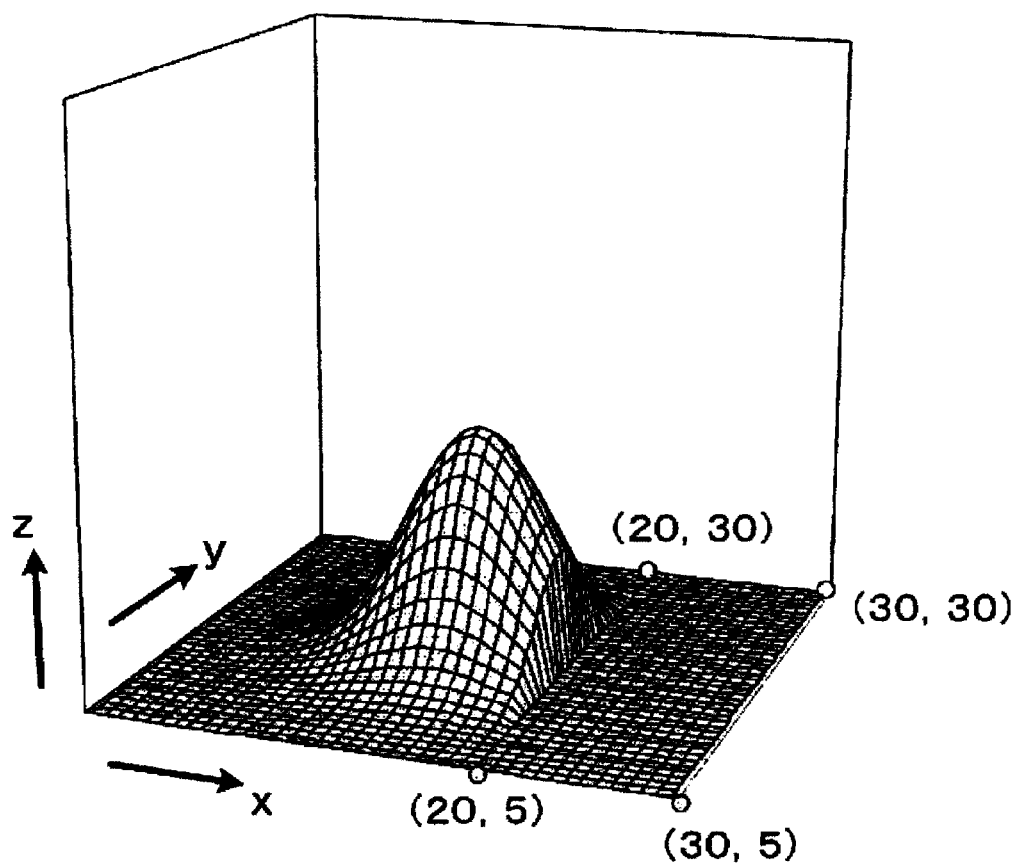
FIG. 26 is a drawing illustrating a probability density distribution in which probability densities satisfying "position 'x' of obstacle ≧20" are set to 0.
Figure 27:
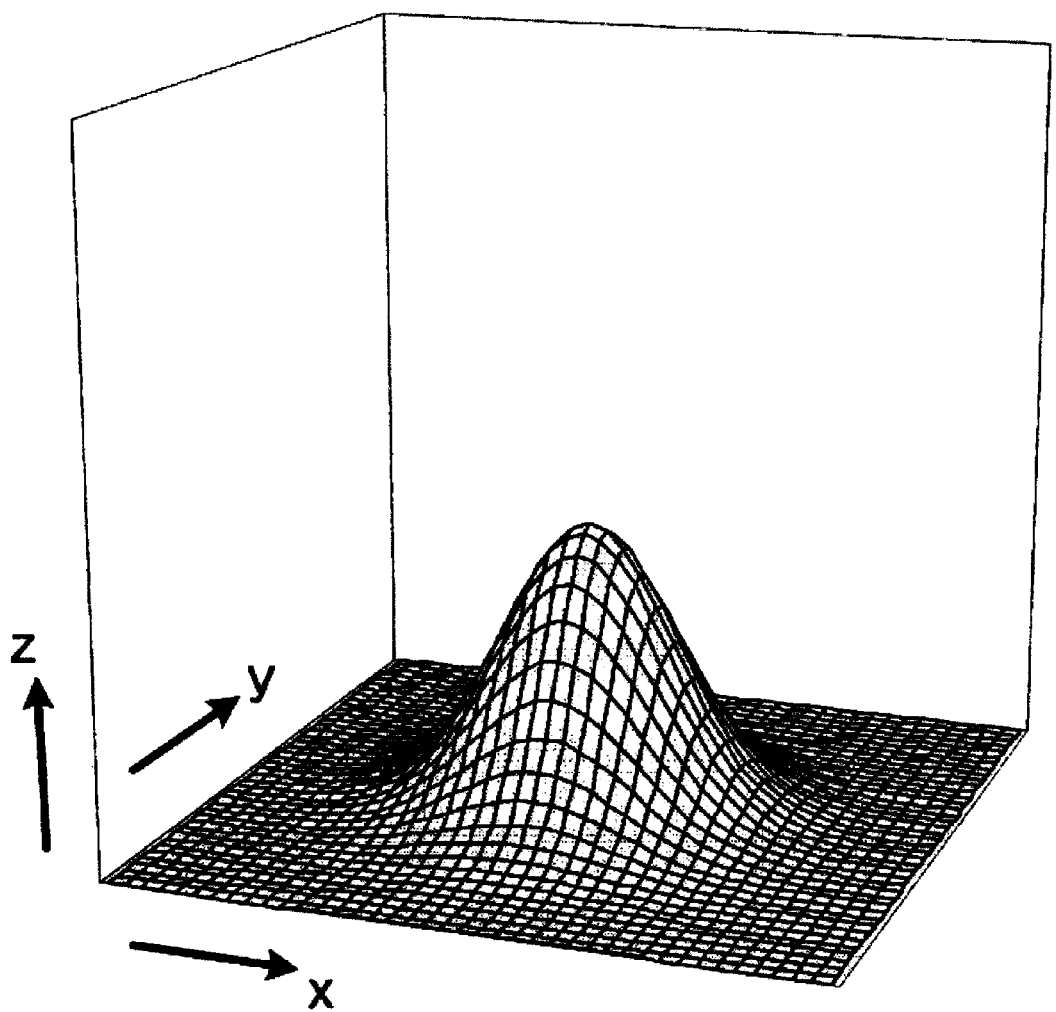
FIG. 27 is a drawing illustrating a probability density distribution when obstacles do not exist.

FIG. 27 illustrates a probability density distribution output from the tag coordinate probability density distribution formation unit 113 if any obstacles do not exist. FIG. 27 is identical to FIG. 26 in setting the coordinates (17,15) as the average of a normal distribution. However, probability densities within the range "x≧20" are not 0 since obstacles are not taken into consideration. Note that even if probability densities satisfying "x≧20" are set to 0 as in FIG. 26, a sum of the integral values of the probability densities must be 1, as in the case of FIG. 27. Therefore, the average of the normal distribution (i.e., the probability density (z-axis values) at the coordinates (17,15) in the example of FIG. 26) is scaled larger than the probability density (z-axis values) at the average of the normal distribution in FIG. 27.

Figure 25:
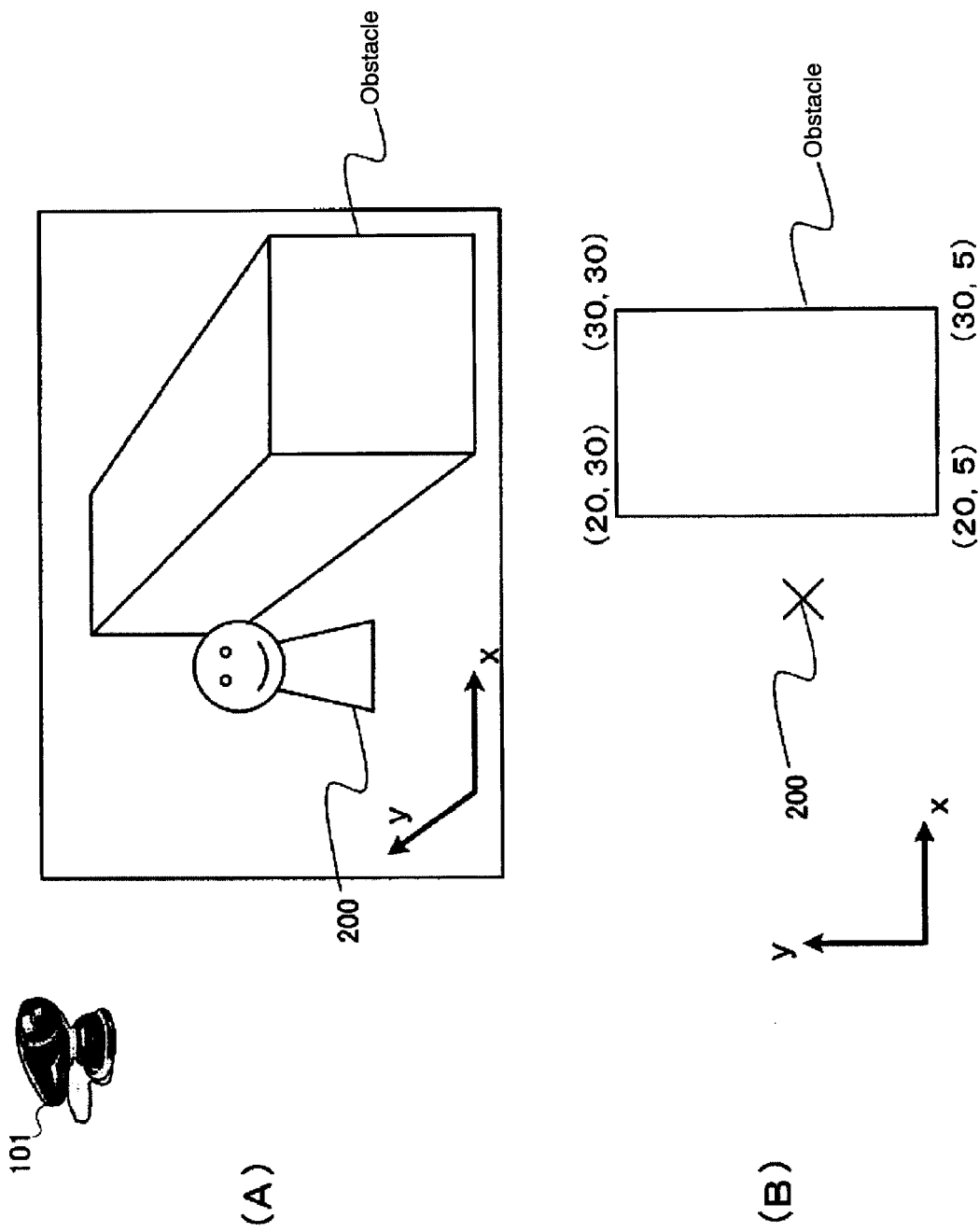
Figure 28:
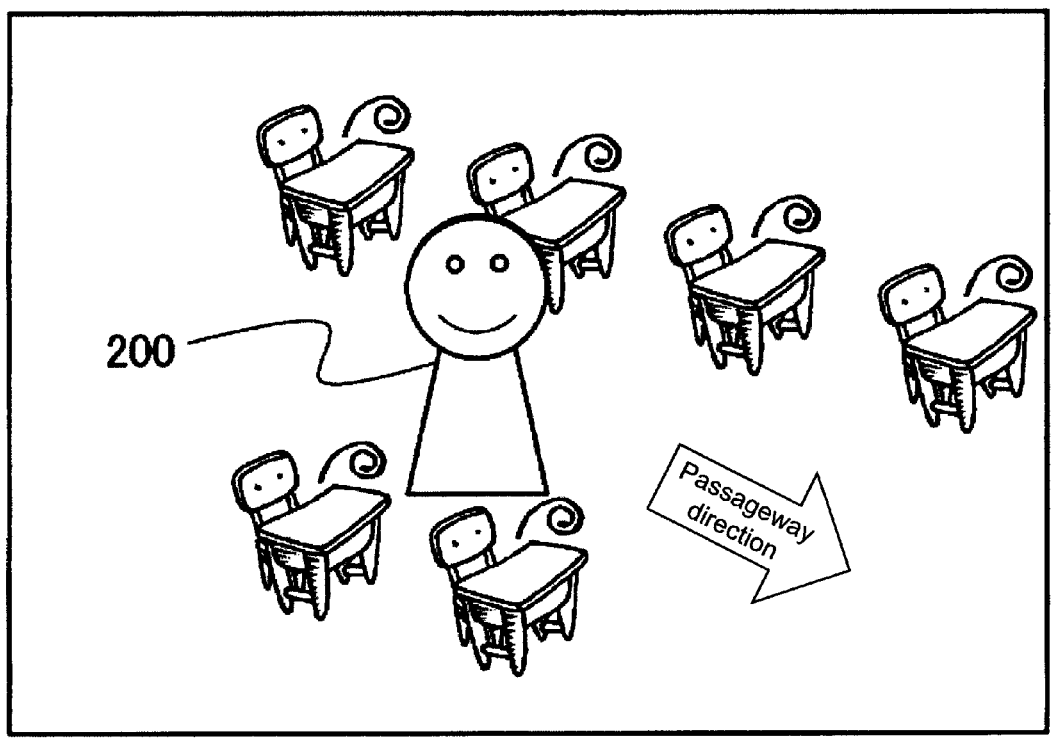
FIG. 28 is an image drawing illustrating that a target is positioned in a passageway.
Figure 29:
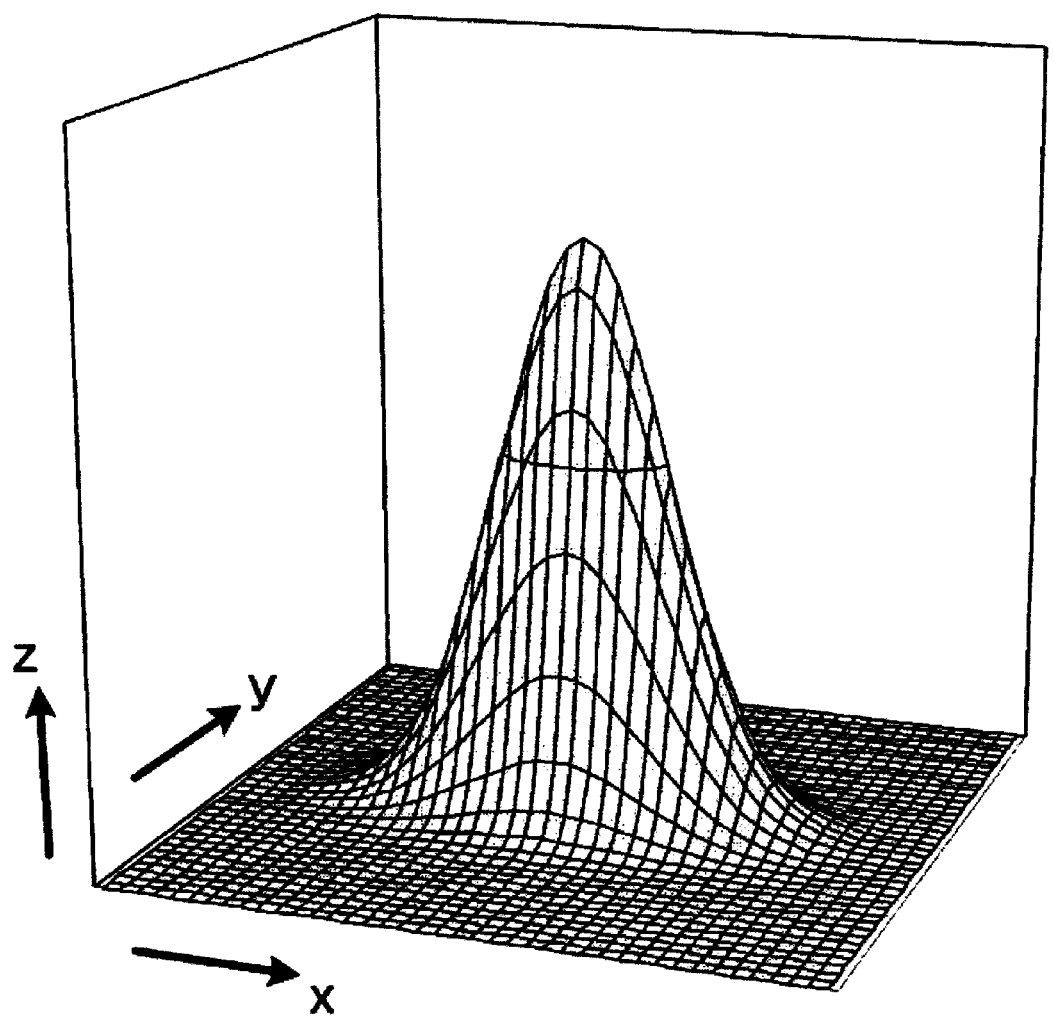
FIG. 29 is a drawing illustrating a probability density distribution when the probability densities of locations other than a passageway are set to 0.

FIGS. 28 and 29 illustrate examples different from those of FIGS. 25 and 26. FIG. 28 is an image drawing illustrating that a target 200 is positioned in a passageway on both sides of which there are obstacles. Note that, although chairs and desks are shown as the obstacles in FIG. 28, the obstacles may be walls and the like, as a matter of course. If such circumstances as illustrated in FIG. 28 are sensed, such a probability density distribution as illustrated in FIG. 29 is output from the tag coordinate probability density distribution formation unit 113. The probability density distribution illustrated in FIG. 29 is shaped so that a normal distribution is scaled up in a passageway direction and scaled down in a direction perpendicular to the passageway direction. As is evident from FIG. 29, probability densities corresponding to the obstacles are made smaller and probability densities corresponding to the passageway are made larger as much.

[Advantages]

As has been described heretofore, according to the present embodiment, an object position estimating device 100 is comprised of: an image coordinate probability density distribution formation unit 103 for forming a first probability density distribution $P_t^V$ with respect to the coordinates of a target 200 on the basis of a picked-up image; a tag coordinate probability density distribution formation unit 113 for forming a second probability density distribution $P_t^T$ with respect to the coordinates of the target 200 on the basis of a signal from a wireless tag 201 attached to the target 200; a tag situation sensing unit 131 for sensing the local circumstances of the wireless tag 201 on the basis of the picked-up image; a probability density distribution change control unit 132 for changing the probability density distribution $P_t^T$ in the tag coordinate probability density distribution formation unit 113 according to the sensed local circumstances of the wireless tag 201; and a probability density integration unit 120 for integrating the first probability density distribution $P_t^V$ and the second probability density distribution $P_t^T$; thereby making it possible to realize an object position estimating device 100 capable of improving position estimating accuracy, compared with a conventional system, by effectively utilizing picked-up images.

That is, according to the present embodiment, the probability density distribution itself is changed according to the results of sensing by the tag situation sensing unit 131 even if the position of the target 200 measured by the wireless tag 201 is the same. Thus, it is possible to make the probability density distribution itself serving as a source of integration even closer to a real one. As a result, position estimating accuracy is improved.

Note that while a description has been made of a case in which the probability density distribution in the tag coordinate probability density distribution formation unit 113 is changed according to the sensed local circumstances. Alternatively, a weighting factor with respect to the probability density distribution $P_t^T$ obtained from the tag coordinate probability density distribution formation unit 113 may be changed according to the sensed local circumstances. In conclusion, the probability density distribution based on the tag coordinate probability density distribution formation unit 113 may be changed in such a manner as described in the above-described embodiments.

In addition, the present invention is also applicable to an object position estimating device which uses a particle filter. Specifically, the tag coordinate probability density distribution formation unit 113 is configured using a particle filter, and likelihood used in the particle filter and/or particles to be excluded are selected according to an obstacle sensed from a picked-up image.

The particle filter is intended to estimate a true value from an observed value containing noise. A multitude of particles are set for the particle filter. Likelihood is allocated to the particles. Thus, the particle filter estimates the true value by repeating processes (1) and (2) described below.

(1) Estimating likelihood at time "t" from the likelihood of each particle at time "t−1". (2) Excluding nonconforming particles by using an observed value at time "t" for likelihood estimated at time "t".

Here, in process (1), the next likelihood (likelihood at time "t") to be estimated is selected according to an obstacle sensed from a picked-up image. In addition, particles to be excluded in process (2) are changed according to the obstacle sensed from the picked-up image. Specifically, likelihood corresponding to the position of the obstacle is lowered and/or particles corresponding to the position of the obstacle are excluded. Consequently, the capability of removing noise due to particles is improved.

Note that in the above-described embodiments, a description has been made of a case in which a sensor attached to the target 200 is a wireless tag 201. Alternatively, the sensor may be a sonic-wave tag, an ultrasonic-wave tag, an infrared tag, or the like. In addition, the embodiments may be such that the target 200 is positioned from a remote place by means of radio, sound, ultrasonic waves, infrared rays, or the like, without the need for the target 200 to carry a device, such as a tag.

While there has been described what are at present considered to be preferred embodiments of the present invention, it is to be understood that various modifications may be made thereto, and it is intended that the appended claims cover all such modifications that fall within the true spirit and scope of the invention.

Industrial Applicability

As has been described heretofore, a position identifying system in accordance with the present invention has the advantage of being able to identify the position of a monitoring target even if an image thereof cannot be taken, and keep track of the movement of the monitoring target. The position identifying system is used as, for example, a factory work efficiency promoting system, a distribution warehouse loss monitoring system, and an office entrance/exit management system, and is therefore useful. In addition, the present invention has the advantage of being capable of improving position estimating accuracy when the position of a target is estimated using a probability density distribution. Thus, the present invention is suitably applied to, for example, an object tracking system.

The invention claimed is:

1. A position identifying system comprising:
a radio terminal device carried by a monitoring target; and
a sensor device provided with a radio communication unit for communicating by radio with the radio terminal device and an image pickup unit for taking an image of the monitoring target;
wherein the radio terminal device comprises:
a discrimination information retaining unit for retaining discrimination information specific to the radio terminal device; and
a transmission unit for transmitting a detection signal used to detect the position of the radio terminal device along with the discrimination information;
and the sensor device comprises:
a radio positioning unit for detecting the position of the radio terminal device on the basis of the detection signal containing the discrimination information received by the radio communication unit;
an image positioning unit for calculating the position of the monitoring target on the basis of an image taken by the image pickup unit; and
an integrated position identifying unit for identifying the position of the monitoring target by linking (i) the position calculated by the image positioning unit and (ii) the position detected by the radio positioning unit and the discrimination information;
a correlation unit for correlating the image positioning and radio positioning results of the monitoring target on the basis of a distance between a position calculated by the image positioning unit and a position detected by the radio positioning unit; and
a positioning accuracy comparison unit for comparing a positioning accuracy of the image positioning of the monitoring target with a positioning accuracy of the radio positioning thereof,
wherein the correlation unit correlates, on the basis of the results of positioning accuracy comparison, the image positioning and radio positioning results of the monitoring target when a position detected by the radio positioning unit exists within a predetermined search area centered on a position calculated by the image positioning unit, when the positioning accuracy of the image positioning is higher, and
wherein the correlation unit correlates, on the basis of the results of positioning accuracy comparison, the image positioning and radio positioning results of the monitoring target when a position calculated by the image positioning unit exists within a predetermined search area centered on a position detected by the radio positioning unit, when the positioning accuracy of the radio positioning is higher.

2. The position identifying system according to claim 1 wherein the sensor device comprises:
a position identification success/failure judgment unit for determining success/failure in identifying the position of the monitoring target by the integrated position identifying unit; and
a pause request unit for transmitting a transmission pause request for decreasing the frequency of detection signal transmission to the radio terminal device when a determination is made in the position identification success/failure judgment unit that identifying the position of the monitoring target has succeeded.

3. The position identifying system according to claim 2 wherein the sensor device comprises:
an image positioning success/failure judgment unit for determining success/failure in the image positioning of the monitoring target by the image positioning unit; and
a first transmission request unit for transmitting a detection signal transmission request to the radio terminal device when a determination is made in the image positioning success/failure judgment unit that the image positioning of the monitoring target has failed.

4. The position identifying system according to claim 2 wherein the sensor device comprises a second transmission request unit for transmitting a detection signal transmission request to the radio terminal device, when a determination is made in the position identification success/failure judgment unit that identifying the position of the monitoring target has failed after the transmission of the transmission pause request.

5. The position identifying system according to claim 3 wherein the sensor device comprises a first discrimination information interpolating unit for once again attaching the discrimination information of the radio terminal device linked with the monitoring target to the image of the monitoring target for which the integrated position identifying unit has failed in position identification in the integrated position identifying unit, when a determination is made that identifying the position of the monitoring target by the integrated position identifying unit has once again succeeded after a determination is made in the position identification success/failure judgment unit that identifying the position of the monitoring target by the integrated position identifying unit has failed.

6. The position identifying system according to claim 3 wherein the sensor device comprises an image interpolating unit for interpolating the image of the monitoring target at the time of failure in image positioning on the basis of a position obtained by previous image positioning and a position obtained by the latest image positioning, when image positioning has once again succeeded after a failure in the image positioning of the monitoring target.

7. The position identifying system according to claim 1 wherein the frequency of detection signal transmission by the radio terminal device and the frequency of the radio positioning of the radio terminal device by the radio positioning unit are set lower than the frequency of the image positioning of the monitoring target by the image positioning unit, and wherein
the sensor device comprises a second discrimination information interpolating unit for attaching the discrimination information of the radio terminal device linked with the image of the monitoring target by the integrated position identifying unit at the time or after the position of the monitoring target is identified, to an image of the monitoring target within an image taken by the image pickup unit before the position identification of the monitoring target by the integrated position identifying unit.

8. The position identifying system according to claim 1 wherein the size of the predetermined search area centered on the position calculated by the image positioning unit is set according to the image positioning accuracy of the monitoring target.

9. The position identifying system according to claim 1 wherein the size of the predetermined search area centered on the position calculated by the radio positioning unit is set according to the radio positioning accuracy of the monitoring target.

10. The position identifying system according to claim 1 comprising a history retaining unit for retaining information on a plurality of positions as candidate information when the plurality of positions detected by the radio positioning unit exists within the predetermined search area centered on the position calculated by the image positioning unit.

11. The position identifying system according to claim 1 comprising a history retaining unit for retaining information on a plurality of positions as candidate information when the plurality of positions detected by the image positioning unit exists within the predetermined search area centered on the position calculated by the radio positioning unit.

12. The position identifying system according to claim 10 wherein the correlation unit correlates the radio positioning and image positioning results of the monitoring target on the basis of the candidate information retained by the history retaining unit.

13. The position identifying system according to claim 11 wherein the correlation unit correlates the radio positioning and image positioning results of the monitoring target on the basis of the candidate information retained by the history retaining unit.

14. The position identifying system according to claim 1 wherein the correction unit comprises a combinational calculation unit for calculating a combination in which a square sum of differences in distance between a position calculated by the image positioning unit and a position detected by the radio positioning unit is minimum.

15. The position identifying system according to claim 1 wherein the integrated position identifying unit decides an average of positions calculated by the image positioning unit and detected by the radio positioning unit as the position of the monitoring target.

16. The position identifying system according to claim 15 wherein the average is a weighted average according to the image positioning and radio positioning accuracies of the monitoring target.

17. The position identifying system according to claim 1 wherein positions calculated by the image positioning unit and detected by the radio positioning unit are located within a cellular space divided into a plurality of cells, and wherein
the correlation unit correlates the image positioning and radio positioning results of the monitoring target on the basis of a positional relationship between a cell to which the position calculated by the image positioning unit belongs and a cell to which the position detected by the radio positioning unit belongs.

18. The position identifying system according to claim 1 comprising a warning unit for performing a process of issuing a warning when a position detected by the radio positioning unit does not exist within a predetermined search area centered on a position calculated by the image positioning unit.

19. A sensor device comprising:
a radio communication unit for communicating by radio with a radio terminal device carried by a monitoring target and used to transmit a detection signal along with discrimination information;
an image pickup unit for taking an image of the monitoring target;
a radio positioning unit for detecting the position of the radio terminal device on the basis of the detection signal containing the discrimination information received by the radio communication unit;
an image positioning unit for calculating the position of the monitoring target on the basis of the image taken by the image pickup unit; and
an integrated position identifying unit for identifying (i) the position of the monitoring target by linking the position calculated by the image positioning unit and (ii) the position detected by the radio positioning unit and the discrimination information,
a correlation unit for correlating an image positioning result of the monitored target and an radio positioning result on the basis of a distance between the position calculated by the image positioning unit and the position detected by the radio positioning unit;
a positioning accuracy comparison unit for comparing a positioning accuracy of the image positioning results with a positioning accuracy of the radio positioning results thereof,
wherein the correlation unit correlates, on the basis of the results of positioning accuracy comparison, the image positioning and radio positioning ring target when a position detected by the radio positioning unit exists within a predetermined search area centered on a position calculated by the image positioning unit, when the positioning accuracy of the image positioning is higher, and
wherein the correlation unit correlates, on the basis of the results of positioning accuracy comparison, the image positioning results and radio positioning results when a position calculated by the image positioning unit exists within a predetermined search area centered on a position detected by the radio positioning unit, when the positioning accuracy of the radio positioning is higher.

20. An object position estimating device comprising:
- a first probability density distribution formation unit for forming a first probability density distribution with respect to coordinates of a target on the basis of a picked-up image taken by a camera;
- a second probability density distribution formation unit for forming a second probability density distribution with respect to coordinates of the target on the basis of a signal of a sensor attached to the target;
- a probability density integration unit for integrating the first probability density distribution and the second probability density distribution;
- a sensing unit for sensing the local circumstances of the target on the basis of the picked-up image; and
- a probability density distribution changing unit for changing, according to the sensed local circumstances, the probability density distribution in the second probability density distribution formation unit or a weighting factor with respect to the second probability density distribution in the probability density integration unit,
- wherein the second probability density distribution is a normal distribution,
- wherein the probability density distribution changing unit changes, according to the sensing results in some regions within the normal distribution, a variance value of the normal distribution, an average value of the normal distribution, probability densities, or the weighting factor,
- wherein the sensor attached to the target is a wireless tag, and
- wherein the sensing unit senses whether or not any obstacles exist between the wireless tag and the object position estimating device itself, so that when any obstacles are sensed, the probability density distribution changing unit makes the variance value of the normal distribution larger, the average value of the normal distribution smaller, or the weighting factor smaller, compared with a case where any obstacles are not sensed.

21. The object position estimating device according to claim 20, wherein the sensing unit senses an obstacle around the target as local circumstances, and wherein
the probability density distribution changing unit sets the probability density of a position where the obstacle has been sensed to 0.

22. The object position estimating device according to claim 20, wherein the sensor attached to the target is a wireless tag, and wherein
the sensing unit senses an obstacle around the target as local circumstances, and wherein
the probability density distribution changing unit changes the average value of the normal distribution depending on whether any obstacles are sensed or not sensed.

23. The object position estimating device according to claim 20, wherein the second probability density distribution formation unit comprises a particle filter, and wherein
the probability density distribution changing unit changes the likelihood of the particle filter and/or particles to be excluded, according to the sensing results.

24. A method of object position estimation including:
- forming a first probability density distribution of a target from a picked-up image including the target;
- forming a second probability density distribution of the target on the basis of a signal of a sensor attached to the target, wherein the second probability density distribution is a normal distribution, and wherein the sensor attached to the target is a wireless tag;
- changing, according to the sensing results in some regions within the normal distribution, a variance value of the normal distribution, an average value of the normal distribution, or probability densities,
- sensing, on the basis of the picked-up image, whether or not any obstacles exist between the wireless tag and a device for detecting the object position estimation,
- so that when any obstacles are sensed, making larger the variance value of the normal distribution, compared with a case where any obstacles are not sensed; and
- integrating the first probability density distribution and the normal distribution of the second probability density distribution.

* * * * *